US012755726B2

(12) United States Patent
Petkovich et al.

(10) Patent No.: US 12,755,726 B2
(45) Date of Patent: Oct. 6, 2026

(54) ACOUSTIC ARTICLES AND ASSEMBLIES

(71) Applicant: 3M INNOVATIVE PROPERTIES COMPANY, St. Paul, MN (US)

(72) Inventors: Nicole D. Petkovich, Little Canada, MN (US); Michelle M. K. Mok, St. Paul, MN (US); Michael R. Berrigan, Oakdale, MN (US); Jonathan H. Alexander, Roseville, MN (US); Samantha D. Smith, Minneapolis, MN (US); Yongbeom Seo, Woodbury, MN (US); Daniel E. Johnson, Marine On St. Croix, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 221 days.

(21) Appl. No.: 18/031,854

(22) PCT Filed: Oct. 18, 2021

(86) PCT No.: PCT/IB2021/059580
§ 371 (c)(1),
(2) Date: Apr. 13, 2023

(87) PCT Pub. No.: WO2022/084830
PCT Pub. Date: Apr. 28, 2022

(65) Prior Publication Data

US 2023/0395056 A1 Dec. 7, 2023

Related U.S. Application Data

(60) Provisional application No. 63/105,023, filed on Oct. 23, 2020.

(51) Int. Cl.
*G10K 11/168* (2006.01)
*G10K 11/165* (2006.01)

(52) U.S. Cl.
CPC .......... *G10K 11/168* (2013.01); *G10K 11/165* (2013.01)

(58) Field of Classification Search
CPC .... G10K 11/168; G10K 11/165; G10K 11/16; D04H 1/56; D06M 11/74; B01J 20/3204; Y10T 428/24273
See application file for complete search history.

(56) References Cited

U.S. PATENT DOCUMENTS 3,971,373 A 7/1976 Braun
4,386,676 A 6/1983 Gadde et al.
(Continued)

FOREIGN PATENT DOCUMENTS

DE 102013213548 A1 1/2015
JP 2005338129 A 12/2005
(Continued)

OTHER PUBLICATIONS

Davies, "The Separation of Airborne Dust and Particles", Proceedings of the Institution of Mechanical Engineers, Jun. 1953, vol. 167, No. 1B, pp. 185-213.
(Continued)

*Primary Examiner* — Forrest M Phillips
(74) *Attorney, Agent, or Firm* — Carlos M. Téllez Rodríguez; M Innovative Properties Co

(57) ABSTRACT

Provided herein are acoustic articles (100) that include a porous layer (102) and heterogeneous filler (104) received in the porous layer. The heterogeneous filler is substantially non-porous and present in an amount of from 0.25% to 7% by volume relative to the total volume of the porous layer and has a specific surface area of from 0.01 $m^2/g$ to 1 $m^2/g$. The acoustic article has a flow resistance of from 500 MKS Rayls to 12,000 MKS Rayls.

16 Claims, 3 Drawing Sheets

(56) References Cited

U.S. PATENT DOCUMENTS

| | | | |
|---|---|---|---|
| 4,657,108 A | 4/1987 | Ward | |
| 5,304,415 A | 4/1994 | Kurihara et al. | |
| 5,332,426 A | 7/1994 | Tang et al. | |
| 6,617,002 B2 | 9/2003 | Wood | |
| 6,851,515 B2 * | 2/2005 | Dussac | G10K 11/165 181/294 |
| 6,916,752 B2 | 7/2005 | Berrigan et al. | |
| 6,977,109 B1 | 12/2005 | Wood | |
| 7,279,440 B2 | 10/2007 | Berrigan et al. | |
| 7,566,475 B2 | 7/2009 | Connelly et al. | |
| 7,731,878 B2 | 6/2010 | Wood | |
| 7,743,880 B2 | 6/2010 | Matsumura et al. | |
| 7,918,313 B2 | 4/2011 | Gross et al. | |
| 8,240,484 B2 | 8/2012 | Fox et al. | |
| 8,278,228 B2 | 10/2012 | Kaneda | |
| 8,906,815 B2 | 12/2014 | Moore et al. | |
| 9,238,203 B2 | 1/2016 | Scheibner et al. | |
| 9,689,096 B2 | 6/2017 | Berrigan et al. | |
| 10,273,612 B2 | 4/2019 | Song et al. | |
| 11,370,203 B2 * | 6/2022 | Ogawa | B32B 27/12 |
| 2005/0042437 A1 | 2/2005 | Ramesh et al. | |
| 2005/0104245 A1 | 5/2005 | Wood | |
| 2008/0038976 A1 | 2/2008 | Berrigan et al. | |
| 2015/0232044 A1 | 8/2015 | Demo et al. | |
| 2016/0298266 A1 | 10/2016 | Zillig et al. | |
| 2017/0132999 A1 | 5/2017 | Coakley et al. | |
| 2019/0256014 A1 | 8/2019 | Bathelier et al. | |
| 2020/0010028 A1 | 1/2020 | Suzuki et al. | |
| 2022/0165242 A1 | 5/2022 | Mok et al. | |

FOREIGN PATENT DOCUMENTS

| | | |
|---|---|---|
| WO | 2013169788 A2 | 11/2013 |
| WO | 2019051761 A1 | 3/2019 |
| WO | 2019079695 A1 | 4/2019 |
| WO | 2020217131 A1 | 10/2020 |

OTHER PUBLICATIONS

International Search Report received for PCT International Application No. PCT/IB2021/059580, mailed on Jan. 20, 2022, 6 pages.
Kim, “Structural Damping by the Use of Fibrous Materials”, SAE Technical Paper, 2015, School of Mechanical Engineering, pp. 1-28.
Venegas, “Influence of Sorption on Sound Propagation in Granular Activated Carbon”, 2016, The Journal of the Acoustical Society of America, vol. 140, No. 2, pp. 755-766.
Wente, “Manufacture of Superfine Organic Fibers” Naval Research Laboratories Report No. 4364 (111437), May 1954, 19 pages.
Wente, “Superfine Thermoplastic Fibers”, Industrial and Engineering Chemistry, Aug. 1956, vol. 48, No. 8, pp. 1342-1346.

* cited by examiner

ACOUSTIC ARTICLES AND ASSEMBLIES

CROSS REFERENCE TO RELATED APPLICATIONS

This application is a national stage filing under 35 U.S.C. 371 of PCT/IB2021/059580, filed Oct. 18, 2021, which claims the benefit of U.S. Provisional Patent Application No. 63/105,023, filed Oct. 23, 2020, the disclosure of which is incorporated by reference in its/their entirety herein.

FIELD OF THE INVENTION

Described are acoustic articles suitable for use in acoustic insulation. These acoustic articles can be useful, for example, for reducing noise in automotive and aerospace applications.

BACKGROUND

Customer demands for faster, safer, quieter, and more spacious vehicles continue to drive improvements in automotive and aerospace technologies. Using conventional technologies, implementing such improvements tends to increase vehicle weight and therefore reduce fuel economy. Lightweighting solutions are available, and these come with counterbalancing factors such as cost, complexity, and manufacturing challenges. It can be a technical challenge to develop such solutions, because measures taken to reduce weight often degrade performance in other areas.

Acoustics absorbers, used in vehicles to address noise, vibration and harshness, represent an example of where such tradeoffs are apparent. To improve fuel efficiency, automotive and aerospace manufacturers have replaced many heavy steel components with lighter weight materials, such as aluminum and plastic. In addition, there is a continued need for thinner constructs that can help increase the size of cabin spaces and offer flexibility in the design process.

Conventional acoustic absorber materials include felt, foam, fiberglass, and polyester materials. These materials are generally provided at higher thicknesses to be effective at absorbing airborne noise over a wide range of frequencies. This has the effect of making the absorbers bulky, which reduces the cabin space available to vehicle occupants and often comes with an increase in mass. Therefore, there is a need for acoustic absorber solutions that bring thinness, light weight, and broad frequency range absorption together in a given article.

SUMMARY

Acoustic dissipators are sought that can provide enhanced absorption at low frequencies (e.g., up to 1600 Hz) than traditional acoustic materials for a given thickness or weight. Advantageously, these materials can display enhanced low-frequency performance while retaining a similar level of intermediate- and high-frequency (e.g., greater than 1600 Hz) performance, which is unusual because enhancements made to low frequency performance generally tend to come at the expense of high frequency performance.

To achieve such low-frequency enhancement, acoustic articles have integrated porous particles into nonwoven webs. These composite constructs have demonstrated technical advantages beyond acoustic absorption, including enhanced transmission loss and vibration damping properties. These features can be highly attractive in automotive, aerospace, and other industrial applications, because thin, high-performance acoustic control articles offer great design flexibility with regards to placement of these constructs. Progress has been made in expanding the range of porous particles that can be included in these constructs, but exploration of largely nonporous particles initially did not reveal any compelling advantages. It was believed that the lack of nanoscale porosity meant that these nonporous materials could not appreciably alter the complex bulk modulus of air in the article.

Surprisingly, however, the non-porous particle-containing BMF webs were found to perform equivalently in industry-relevant acoustic absorption testing (the alpha cabin test) to webs loaded with porous, high-surface area particles. Furthermore, certain configurations were discovered to be especially advantageous in achieving a high degree of absorption over a wide frequency range. Advantageously, airflow resistance (also called flow resistance) could be adjusted by disposing additional scrims onto the exterior surfaces of the loaded acoustic article. Scrims are relatively thin layers, each layer typically having a basis weight of less than 150 gsm and can have a thickness of less than 3 millimeters, less than 2 millimeters, or even less than 1 millimeter. Preferably, scrims do not substantially reflect sound to allow the acoustic article to function more effectively as an absorber.

The incorporation of nonporous or weakly porous particles into a porous layer represents a major advantage over nanoporous materials in terms of cost effectiveness and enhanced flexibility in terms of material choices. Liquid, water vapor and other gas-phase species can adsorb and block porosity in porous acoustic particles, degrading performance. This problem is eliminated with nonporous particles. The provided acoustic absorbers can avoid the need for complex multi-layer constructs to achieve high acoustic dissipation.

In a first aspect, an acoustic article is provided. The acoustic article comprises a porous layer; and heterogeneous filler received in the porous layer, the heterogeneous filler being substantially non-porous and present in an amount of from 0.25% to 7% by volume relative to the total volume of the porous layer, and having a specific surface area of from 0.01 $m^2/g$ to 1 $m^2/g$, wherein the acoustic article has a flow resistance of from 500 MKS Rayls to 12,000 MKS Rayls.

In a second aspect, an acoustic assembly is provided, comprising the acoustic article, wherein the acoustic article has opposing first and second major surfaces; a substrate is disposed along the first major surface; and an air gap is disposed along the second major surface.

In a third aspect, a method of making an acoustic article is provided, comprising: directly forming a non-woven fibrous web; delivering a heterogeneous filler into the non-woven fibrous web as the non-woven fibrous web is being directly formed, the heterogeneous filler being present in an amount of from 0.25% to 7% by volume relative to the total volume of the porous layer, and having a specific surface area of from 0.1 $m^2/g$ to 1 $m^2/g$, wherein the acoustic article has a flow resistance of from 500 MKS Rayls to 12,000 MKS Rayls.

Figure 1:
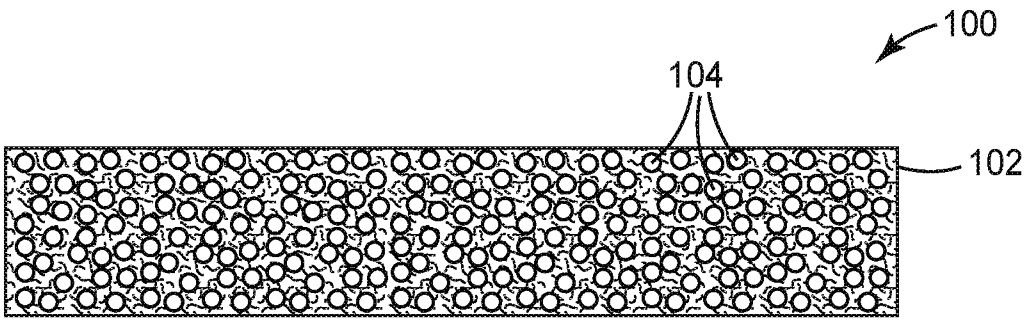
FIGS. 1-8 are side elevational views of single-layered and multi-layered acoustic articles according to various embodiments.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DEFINITIONS

As used herein:

"Average" means number average, unless otherwise specified.

"Copolymer" refers to polymers made from repeat units of two or more different polymers and includes random, block and star (e.g. dendritic) copolymers.

"Die" means a processing assembly including at least one orifice for use in polymer melt processing and fiber extrusion processes, including but not limited to melt-blowing.

"Discontinuous" means not extending across an entire thickness, width, or length dimension of a given article.

"Effective fiber diameter" (or "EFD") is the apparent diameter of the fibers in a fiber web made without fillers, calculated from a pressure drop (measured using the "Pressure Drop Test" described herein), a thickness (measured the "Nonwoven Thickness Test 1" described herein) and a face velocity of 5.3 cm/sec. Based on the measured pressure drop, the Effective Fiber Diameter in microns was calculated as set forth in C. N. Davies, The Separation of Airborne Dust and Particulates, Institution of Mechanical Engineers, London Proceedings, IB (1952).

"Glass transition temperature (or $T_g$)" of a polymer refers to a temperature at which there is a reversible transition in an amorphous polymer (or in an amorphous region within a semi crystalline polymer) from a hard and relatively brittle "glassy" state into a viscous or rubbery state as the temperature is increased.

"Median fiber diameter" of fibers in a non-woven fibrous layer is determined by producing one or more images of the fiber structure, such as by using a scanning electron microscope; measuring the transverse dimension of clearly visible fibers in the one or more images resulting in a total number of fiber diameters; and calculating the median fiber diameter based on that total number of fiber diameters.

"Non-woven fibrous layer" means a plurality of fibers characterized by entanglement or point bonding of the fibers to form a sheet or mat exhibiting a structure of individual fibers or filaments which are interlaid, but not in an identifiable manner as in a knitted fabric.

"Particle" refers to a small distinct piece or individual part of a material (i.e., a primary particle) or aggregate thereof in finely divided form. Primary particles can include flakes, powders and fibers, and may clump, physically intermesh, electrostatically associate, or otherwise associate to form aggregates. In certain instances, particles in the form of aggregates of individual particles may be formed as described in U.S. Pat. No. 5,332,426 (Tang et al.).

"Polymer" means a relatively high molecular weight material having a molecular weight of at least 10,000 g/mol.

"Porous" means containing holes or voids, which may be internal or external.

"Shrinkage" means reduction in the dimension of a fibrous non-woven layer after being heated to 150° C. for 7 days based on the test method described in U.S. Patent Publication No. 2016/0298266 (Zillig et al.);

"Size" refers to the longest dimension of a given object or surface.

"Substantially" means a majority of, or mostly, as in an amount of at least 50%, 60, 70, 80, 90, 95, 96, 97, 98, 99, 99.5, 99.9, 99.99, or 99.999%, or 100%.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention.

Acoustic Articles

Exemplary acoustic articles are illustrated in FIGS. 1-8 and described below. These acoustic articles can be effective in addressing both noise and undesirable vibrations associated with a structure. In some embodiments, the acoustic article can be disposed on a substrate or placed proximate to an air cavity to absorb sound energy being transmitted through the substrate or air cavity, respectively. In other embodiments, the acoustic article can be placed proximate to a surface to damp vibrations of the surface.

Damping applications include nearfield damping applications. Nearfield damping is a mechanism that dissipates the vibration energy of a structure by controlling both non-propagating and propagating waves that are created near the surface (nearfield region) of the structure by structural vibration. In the nearfield region, oscillatory and incompressible fluid flows parallel to the surface of the structure, with the strength of these flows decreasing gradually with increasing distance from the surface of the vibrating structure. The strength of the energy in this region can be significant, so dissipation of the energy in this region can help attenuate structural vibration.

The nearfield region can be defined as from 30 centimeters to 0 centimeters, from 15 centimeters to 0 centimeters, from 10 centimeters to 0 centimeters, from 8 centimeters to 0 centimeters, from 5 centimeters to 0 centimeters, relative to the surface of a given substrate (or structure). Here, "0 centimeters" is defined as being at the surface of the substrate.

Further details concerning nearfield damping are described in Nicholas N. Kim, Seungkyu Lee, J. Stuart Bolton, Sean Hollands and Taewook Yoo, *Structural damping by the use of fibrous materials*, SAE Technical Paper, 2015-01-2239, 2015.

As shown in these figures, useful acoustic articles include both single-layered and multilayered constructions. Unless specifically indicated otherwise, it is to be understood that one or more additional layers or surface treatments may be present on either major surface of a given acoustic article, or between otherwise adjacent layers of the acoustic article.

FIG. 1 shows a single-layered acoustic article hereinafter referred to by the numeral 100. The article 100 includes a porous layer 102 and a plurality of heterogeneous filler 104 dispersed therein. In this embodiment, the heterogeneous filler 104 is dispersed in the porous layer 102 uniformly across its entire thickness as shown. The heterogeneous filler 104 and aggregates thereof can be either continuously or discontinuously dispersed in the porous layer 102.

For the sake of example, the porous layer 102 is depicted here as a fibrous non-woven layer comprised of a plurality of fibers, but other types of porous layers (e.g., open-celled foams, particulate beds) can also be used. Useful porous layers are described in detail in a separate sub-section below, entitled "Porous layers."

Heterogeneous filler 104 having desirable acoustic properties is enmeshed in the plurality of fibers of the porous layer 102. The filler is can present in an amount of 0.25 percent to 7 percent, from 0.5 percent to 6 percent, or in some embodiments, less than, equal to, or greater than 0.25 percent, 0.3, 0.4, 0.5, 0.6, 0.7, 0.8, 0.9, 1, 1.25 1.5, 1.75, 2, 2.5, 3, 3, 3.5, 4, 4.5, 5, 5.5, 6, 6.5, or 7 percent by volume relative to the total volume of the porous layer 102. A method for determining volume percentage of the filler is provided in the Examples.

Alternately, the heterogeneous filler 104 can be present in an amount of from 5% to 60%, 5% to 65%, or in some embodiments, less than, equal to, or greater than 5%, 6, 7, 8, 9, 10, 11, 12, 13, 14, 15, 16, 17, 18, 19, 20, 22, 25, 27, 30, 32, 35, 37, 40, 45, 50, 55, 60, or 65% by weight relative to the combined weight of the porous layer 102 and heterogeneous filler 104.

A more detailed account of useful heterogeneous fillers is provided in a later sub-section entitled "Heterogeneous fillers."

The heterogeneous filler 104 in the porous layer 102 can affect the average fiber-to-fiber spacing within the nonwoven fibrous structure of the porous layer 102. The extent to which this occurs depends, for example, on the particle size of the heterogeneous filler 104 and the loading of the heterogeneous filler 104 within the porous layer 102. The porous layer 102 can have an average fiber-to-fiber spacing of from 0 micrometers to 1000 micrometers, from 10 micrometers to 500 micrometers, from 20 micrometers to 300 micrometers, or in some embodiments, less than, equal to, or greater than 0 micrometers, 1, 2, 3, 4, 5, 7, 10, 11, 12, 15, 17, 20, 25, 30, 35, 40, 45, 50, 60, 70, 80, 90, 100, 110, 120, 150, 170, 200, 250, 300, 350, 400, 450, 500, 600, 700, 800, 900, or 1000 micrometers.

Conversely, the heterogeneous filler 104 within the acoustic article 100 has an interparticle (i.e., particle-to-particle) spacing that is at least partially dependent on both its loading level as well as the structural nature of the porous layer 102. The heterogeneous filler 104 can have an average interparticle spacing of from 20 micrometers to 4000 micrometers, from 50 micrometers to 2000 micrometers, from 100 micrometers to 1000 micrometers, or in some embodiments, less than, equal to, or greater than 20 micrometers, 25, 30, 35, 40, 45, 50, 60, 70, 80, 90, 100, 110, 120, 150, 170, 200, 250, 300, 350, 400, 450, 500, 600, 700, 800, 900, 1000, 1100, 1200, 1500, 1700, 2000, 2500, 3000, 3500, or 4000 micrometers.

Average fiber-to-fiber spacing, particle-to-fiber, and particle-to-particle spacing can be obtained using X-ray microtomography, a nondestructive 3D imaging technique where the contrast mechanism is the absorption of X-rays by components within the sample under examination. An X-ray source illuminates the sample and a detection system collects projected 2D X-ray images at discrete angular positions as the sample is rotated.

The collection of projected 2D images are taken through the process known as reconstruction to produce a stack of 2D slice images along the axis of sample rotation. The reconstructed 2D slice images can be examined individually, as a series of images, or be used collectively to generate a 3D volume containing the examined sample. Measurements can be made, for example, using a SKYSCAN 1172 (Bruker microCT, Kontich, Belgium) X-ray microtomography scanner at a suitable resolution (e.g., 1-3 micrometers), and X-ray source settings of 40 kV and 250 μA.

The reconstructed images can then be processed to isolate the location of the particles or particles and fibers within the scanned specimen. A greyscale threshold can allow isolation of the particles from the lower density material in the porous layer and isolation of the particles and fibers from lower density noise in the dataset. Processing can be conducted, for example, using CT Analyzer software (v 1.16.4 Bruker microCT, Kontich, Belgium) to obtain average particle-to-particle, particle-to-fiber, and fiber-to-fiber spacings.

The desirable thickness of the porous layer 102 is highly dependent on the application and thus need not be particularly restricted. The porous layer 102 can have an overall thickness of from 1 micrometer to 10 centimeters, from 30 micrometers to 1 centimeter, from 50 micrometers to 5000 millimeters, or in some embodiments, less than, equal to, or greater than, 1 micrometer, 2, 5, 10, 20, 30, 40, 50, 100, 200, 500 micrometers, 1 millimeter, 2, 3, 4, 5, 7, 10, 20, 50, 70, or 100 millimeters.

Advantageously, the combination of the porous layer 102 and heterogeneous filler 104 can significantly enhance acoustical absorption at low sound frequencies, such as sound frequencies of from 100 Hz to 1600 Hz while preserving acoustical absorption at higher sound frequencies exceeding 1600 Hz.

In some embodiments, the addition of heterogeneous filler can substantially increase acoustical absorption of the acoustic article over sound frequencies of less than, equal to, or greater than 100 Hz, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 400, 500, 700, 1000, 2000, 3000, 4000, 5000, 7000, or 10,000 Hz.

Figure 2:
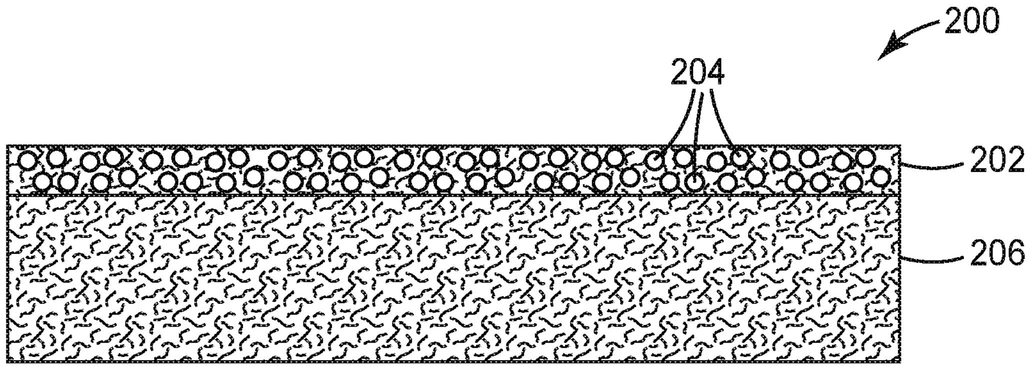

FIG. 2 shows an article 200 according to a dual-layered embodiment comprised of a first porous layer 202 containing heterogeneous filler 204 and a second porous layer 206 that does not contain the heterogeneous filler 204. As shown, the second porous layer 206 extends across and directly contacts the first porous layer 202. The first porous layer 202 can have characteristics similar to those of the porous layer 102 already described with respect to FIG. 1.

Other embodiments are possible. For example, the heterogeneous filler may be only partially enmeshed in the first porous layer, with some heterogeneous filler residing outside of this layer. In another embodiment, essentially none of the heterogeneous filler is enmeshed in the first porous layer, while essentially all of the heterogeneous filler is present in a particulate bed of heterogeneous filler confined between the first and second porous layers, both of which are unfilled.

Referring again to FIG. 2, the second porous layer 206 has a thickness significantly greater than that of the first porous layer 202. Depending on the nature of the noise to be attenuated, it might be advantageous for the first porous layer 202 to have a thickness significantly greater than that of the second porous layer 206. One porous layer may have a thickness that is less than, equal to, or greater than 10%, 20%, 30%, 40%, 50%, 60%, 70%, 80%, 90%, 100%, 110%, 120%, 130%, 140%, 150%, 200%, 250%, 300%, 400%, 500%, 600%, 700%, 800%, 900%, or 1000% of the thickness of the other porous layer.

Figure 3:
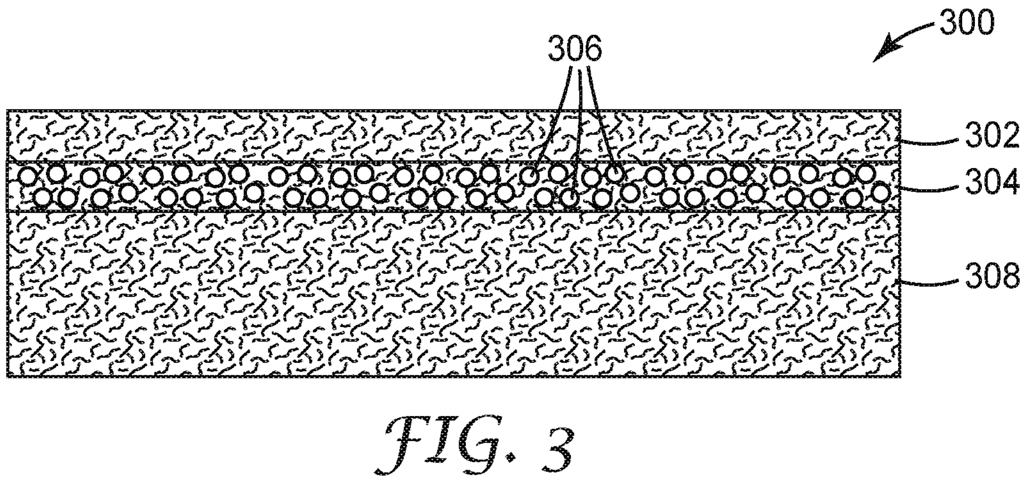

One or more additional layers can be disposed between these layers or extend along the exterior-facing major surfaces of the first and second porous layers 202, 206. An example of such a construction is shown in FIG. 3. FIG. 3 depicts an article 300 having three porous layers, where the first and third porous layers 302, 308 are unfilled and the second porous layer 304 is filled and sandwiched between the former two layers.

In the multilayered constructions (e.g., the articles 200, 300 of FIGS. 2 and 3), the unfilled porous layers can improve the low frequency performance of the overall acoustic article. In order to achieve high acoustic absorption, the acoustic impedance of the article can be close to the characteristic impedance of surrounding fluid. If the surrounding fluid is air, then the characteristic impedance is the product of the density and the speed of sound of the air medium. The porous layers can thus help match the acoustic impedance of the multilayered articles to the characteristic impedance of the surrounding medium.

For normal incidence plane wave situation, the specific acoustic impedance at the surface of the material, $z_{surf}$, with the thickness L can be described as following equation:

$$z_{surf}=p/v|_{x=L}=-jz_c \cot(kx)|_{x=L},$$

where p is acoustic pressure, v is particle velocity, k is the acoustic wave number, x is the distance from a substrate surface, $z_c$ is the characteristic impedance of the air and they can be obtained from following relationships:

$$k=2\pi f/c$$

$$z_c=(\rho K)^{1/2}$$

where f denotes frequency, c denotes speed of sound of the air, ρ and K are density and bulk modulus of the air, respectively. The highest acoustic absorption occurs when the specific acoustic impedance at the surface becomes zero. Therefore, a sound absorbing material generally follows the quarter wavelength rule, in which a quarter wavelength corresponds to the thickness of the material. This quarter wavelength corresponds to the frequency at which the material displays its first peak absorption.

Decreasing the speed of sound can improve the low frequency performance without increasing the thickness of the material. At the surface where the material is placed against the rigid wall, the surface impedance becomes infinite since particle velocity, v, and x above both approach zero. Based on the above relationship, it is surmised that the heterogeneous filler within a porous layer can help lower the frequency that provides zero acoustic impedance at the surface of material by changing the wavelength within the material and providing a pressure-reducing effect. In some embodiments, the addition of heterogeneous filler can also enable reflections of the sound waves to be reduced within the acoustic article. Reducing pressure also lowers acoustic impedance, enabling some sound to penetrate and helping entrap more sound energy within the overall acoustic article, thereby improving dissipation of noise and thus barrier performance.

In the above embodiments, the heterogeneous filler is substantially decoupled from each other and any porous layers; that is, the particles of the heterogeneous filler are not physically attached to each other and capable of at least limited movement or oscillation independently from the surrounding structure. In these instances, the enmeshed particles can move and vibrate within the fibers of the non-woven material largely independently of the fibers themselves.

Alternatively, at least some of the heterogeneous filler could be physically bonded to the porous layers in which it is disposed. In some embodiments, these physical bonds are created by incorporating binders (e.g., binder fibers) within the porous layer, which can become tacky and adhere to the filler particles upon application of heat.

It is to be understood that further embodiments are also possible in which the acoustic article is comprised of four, five, six, seven, or even more porous layers, where at least one porous layer contains, or is otherwise in contact with, the heterogeneous filler.

Inclusion of a resistive layer, such as a resistive scrim, can provide further enhancement of acoustic performance, particularly at lower frequencies. In a preferred embodiment, the resistive layer is made from a spunbond web with fibers having a median fiber diameter greater than 10 micrometers, the web having a flow resistance of less than 1500 MKS Rayls. In general, the flow resistance through the resistive layer can be less than, equal to, or greater than 500 MKS Rayls, 600, 700, 800, 900, 1000, 1100, 1200, 1500, 1700, 2000, 2500, 3000, 3500, 4000, 4500, 5000, 5500, 6000, 6500, 7000, 7500, 8000, 9000, or 10,000 MKS Rayls.

The resistive layer can have a thickness of from 1 micrometer to 10 centimeters, from 30 micrometers to 1 centimeters, from 50 micrometers to 5000 micrometers, or in some embodiments, less than, equal to, or greater than 10 micrometers, 20, 30, 40, 50, 70, 100, 200, 500, 1 millimeter, 2, 5, 10, 20, 30, 40, 50, 60, 70, 80, 90, or 100 millimeters (10 centimeters).

Optionally, the acoustic article could also include an airflow transparent layer, such as an airflow transparent scrim. Preferably, an airflow transparent layer displays minimal flow resistance, but serves one or more beneficial functions. For example, this layer could provide sealing function that prevents shedding of the heterogeneous filler from the porous layer. Typical examples of airflow transparent layers have relatively large pore sizes, and include uncalendared spunbond webs, carded webs having a solidity below 10%, and spunlaced webs. The flow resistance through the airflow transparent layer can be less than 600 MKS Rayls, less than 500 MKS Rayls, less than 400 MKS Rayls, less than 300 MKS Rayls, or less than 250 MKS Rayls.

Figure 4:
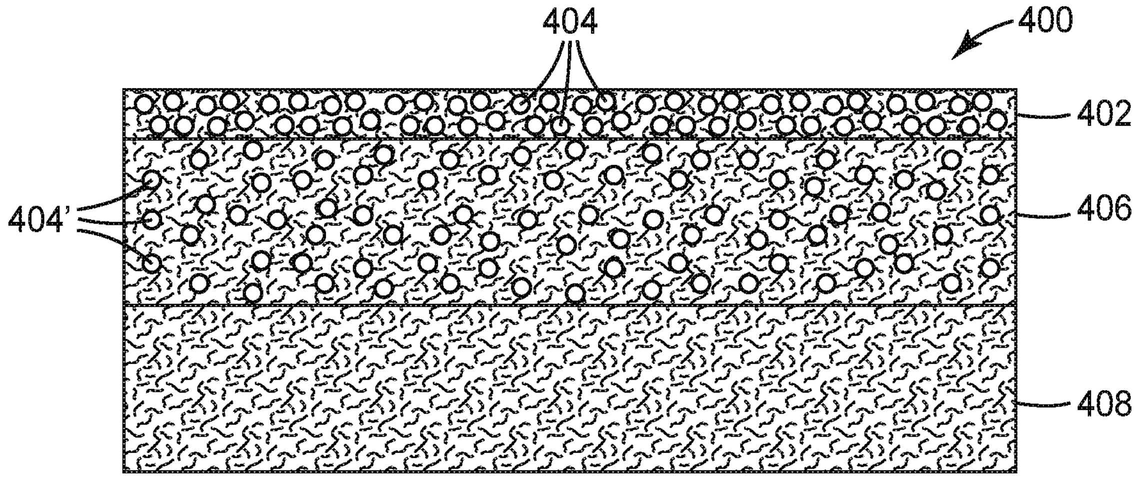

FIG. 4 shows an acoustic article 400 in which porous layers have disparate loadings of heterogeneous filler. In this construction, the article 400 has a first porous layer 402 with a high relative loading of heterogeneous filler 404, a second porous layer 406 having a low relative loading of heterogeneous filler 404', and a third porous layer 608 devoid of any heterogeneous filler. The heterogeneous fillers 404, 404' may or may not have the same composition. The heterogeneous fillers 404, 404' may or may not have the same median particle size. Likewise, the porous layers 402, 406, 408 are intended here to be generic and thus may or may not have the same composition and structure.

If the heterogeneous fillers 404, 404' have the same composition and particle size, the article 400 has discrete layers that progressively decrease in density from the top of the article 400 to the bottom of the article 400 as shown in FIG. 4. Advantages of this construction include design freedom and customization, reduced costs, and tunability, enabling acoustic absorption to be enhanced over certain frequencies as needed.

Figure 5:
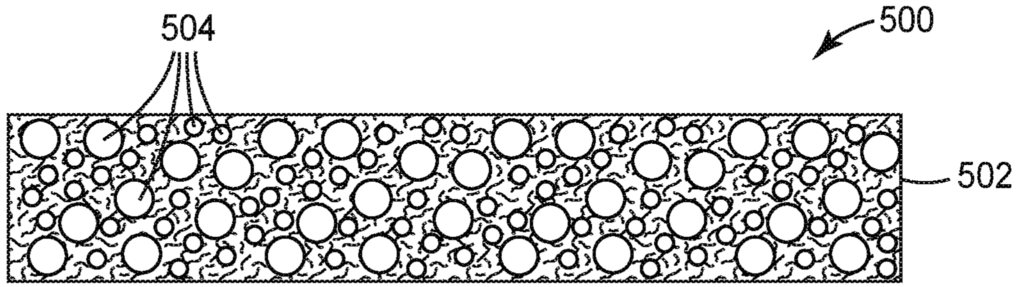

FIG. 5 shows an acoustic article 500 in which a monolithic porous layer 502 contains heterogeneous filler 504 of two distinct particle sizes. The heterogeneous filler 504 may have a bimodal distribution of particle sizes, as shown here, or some other multimodal distribution. Alternatively, the heterogeneous filler 504 may have a distribution that is monomodal but broad. By mixing together heterogeneous fillers having different particle sizes, it is possible to increase total filler loading because the smaller particles can occupy the interstices formed by the larger particles.

Figure 6:
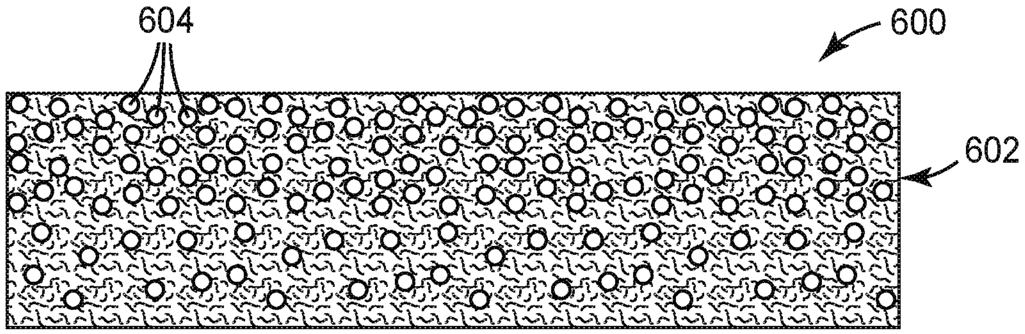

FIG. 6 shows an acoustic article 600 that uses a porous layer 602 containing a density gradient of heterogeneous filler 604. As shown, the density is greatest approaching its top major surface and lowest approaching its bottom major surface.

Figure 7:
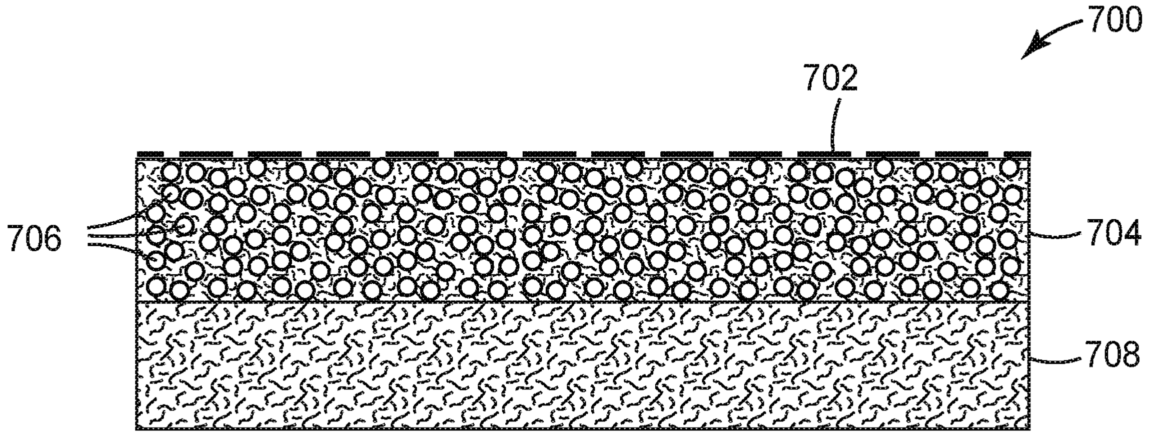
Figure 8:
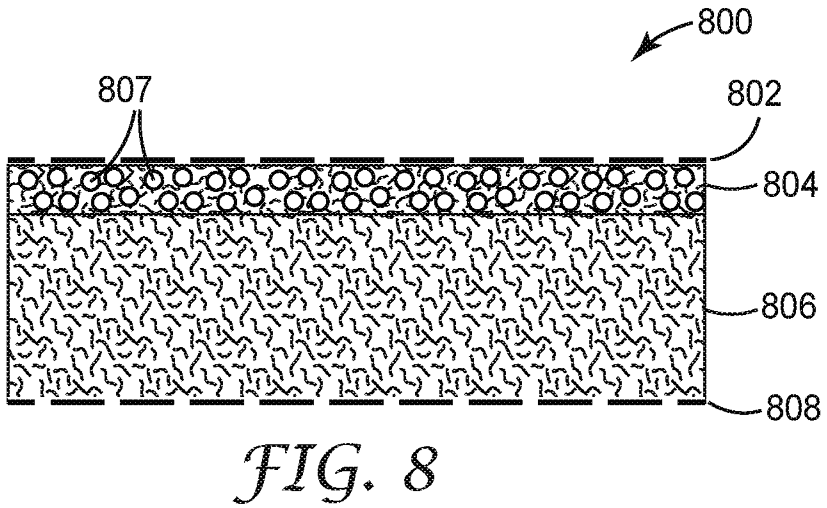

FIGS. 7 and 8 illustrate further variations and combinations of the acoustic layers previously presented. FIG. 7, for example, shows an acoustic article 700 in which a first porous layer 702 is a perforated film disposed on a second porous layer 704 comprised of a non-woven fibrous web that contains a plurality of heterogeneous filler 706. The layers 702, 704 are backed by a third porous layer 708 that is unfilled and also made from a non-woven fibrous web. As indicated above, these constructions allow the acoustic behavior of the overall acoustic article to be tuned to a particular application. Such acoustic behavior may include a combination of reflection, absorption, and noise cancellation.

FIG. 8 shows an acoustic article 800 also similar to article 700 in FIG. 7 except it includes a fourth porous layer 808 extending across the first, second, and third porous layers 802, 804, 806, where heterogeneous filler 807 is enmeshed in the second porous layer 804. The fourth porous layer 808 is a perforated film that does not contain or directly contact the heterogeneous filler 807.

Substrates include structural components, such as components of an automobile or airplane and architectural substrates. Structural examples include molded panels (e.g., door panels), aircraft frames, in-wall insulation, and integral ductwork. Substrates can also include components next to these structural examples, such as carpets, trunk liners, fender liners, front of dash, floor systems, wall panels, and duct insulation. In some cases, a substrate can be spaced apart from the acoustic article, as might be the case with hood liners, headliners, aircraft panels, drapes, and ceiling tiles. Further applications for these materials include filtration media, surgical drapes, and wipes, liquid and gas filters, garments, blankets, furniture, transportation (e.g., for aircraft, rotorcraft, trains, and automotive vehicles), electronic equipment (e.g. for televisions, computers, servers, data storage devices, and power supplies), air handling systems, upholstery, and personal protection equipment.

In the aforementioned acoustic articles, the solidity of a given layer depends on the extent to which heterogeneous filler is loaded within that layer. Solidity may increase if heterogeneous filler particles occupy spaces that would have otherwise remained as voids in the porous layer. Solidity may also decrease, however, if inclusion of the heterogeneous filler opens up the structure of the porous layer, creating voids that otherwise would not have existed.

As used herein, solidity is a property inversely related to density and is characteristic of web permeability and porosity. A formula for solidity is provided in the Examples. A low solidity corresponds to high permeability and high porosity. The provided porous layers, excluding the heterogeneous filler, can have a solidity of from 1 percent to 10 percent, from 2 percent to 8 percent, from 3 percent to 7 percent, or in some embodiments, less than, equal to, or greater than 1 percent, 1.1, 1.2, 1.3, 1.4, 1.5, 1.6, 1.7, 1.8, 1.9, 2, 2.2, 2.5, 2.7, 3, 3.5, 4, 4.5, 5, 5.5, 6, 6.5, 7, 7.5, 8, 8.5, 9, 9.5, or 10 percent.

Any of the aforementioned acoustic articles may further include one or more enclosed air gaps between adjacent layers. Air gaps can act as resonant chambers to enhance transmission loss through an acoustic article at particular frequencies. The air gap can act as an acoustic resonator based on quarter wavelength theory. According to this theory, the peak acoustic absorption occurs at a frequency representing the quarter wavelength of the thickness of the acoustic layer. Larger air gaps shift the peak acoustic absorption to lower frequencies. For example, a 5-centimeter thick air gap may have a peak absorption at 1600 Hz, while a 10 cm air gap may produce a peak absorption occurring at 800 Hz.

In one embodiment, an acoustic article has opposing first and second major surfaces, where a substrate is disposed along the first major surface, and an air gap is disposed along the second major surface. The air gap can have any thickness that allows it to function as an acoustic resonator. Typically, depending on the acoustic frequency of interest, the air gap can have a thickness of from 10 micrometers to 10 centimeters, from 500 micrometers to 5 centimeters, from 1 millimeter to 3 centimeters, or in some embodiments, less than, equal to, or greater than 10 micrometers, 20, 30, 40, 50, 70, 100, 200, 500, 1 millimeter, 2, 5, 10, 20, 30, 40, 50, 60, 70, 80, 90, or 100 millimeters (10 centimeters).

The provided acoustic articles can also include a layer that contains a plurality of Helmholtz resonators in contact with the porous layer. This layer can be disposed on either major surface of the acoustic article or disposed between otherwise adjacent layers within the acoustic article.

A Helmholtz resonator is essentially a tiny container filled with air, where the container has an open port. The volume of air within the container has a springiness that allows it to vibrate and dissipate sound energy at a certain frequency, or range of frequencies. The Helmholtz resonators can be disposed in a two-dimensional array extending along a major surface of the acoustic article. While not intended to be limiting, examples of suitable Helmholtz resonators include, for example, those described in International Publication No. WO 2013/169788 (Castiglione et al.).

Porous Layers

The provided acoustic articles include one or more porous layers. Useful porous layers include, but are not limited to, non-woven fibrous layers, perforated films, particulate beds, and open-celled structures such as open-celled foams, fiberglass, nets, woven fabrics, and combinations thereof. Porous layers are generally permeable, enabling air or some other fluid to freely communicate between opposite sides of the layer. Such layers may also be semi-permeable (permeable along some but not all of the thickness dimension) or impermeable.

Certain non-woven fibrous layers can be effective sound absorbers even without inclusion of heterogeneous filler. For example, non-woven materials that contain a plurality of fine fibers can be very effective at attenuating high sound frequencies. In this frequency regime, the surface area of the structure can promote viscous dissipation of noise, a process whereby sound energy is converted into heat.

Non-woven layers can be made from a wide variety of materials, including organic and inorganic materials. One inorganic fibrous non-woven material is fiberglass. Fiberglass is generally made by melting silica and other minerals in a furnace and then extruding them through spinnerets that contain tiny orifices to produce streams of molten glass. Guided by the flow of hot air, these streams are cooled into fibers and deposited onto a conveyor belt, where the fibers are interlaced with each other to obtain a non-woven fiberglass layer.

Polymeric non-woven layers can be directly formed using a melt blowing process. Melt blown non-woven fibrous layers can contain very fine fibers. In melt-blowing, one or more thermoplastic polymer streams are extruded through a die containing closely arranged orifices. These polymer streams are attenuated by convergent streams of hot air at high velocities to form fine fibers, which are then collected on a surface to provide a melt-blown non-woven fibrous layer.

Polymeric non-woven layers can also be made by a process known as melt spinning. In melt spinning, the non-woven fibers are extruded as filaments out of a set of orifices and allowed to cool and solidify to form fibers. The filaments are passed through an air space, which may contain streams of moving air, to assist in cooling the filaments and passing through an attenuation (i.e., drawing) unit to at least partially draw the filaments. Fibers made through a melt spinning process can be "spunbonded," whereby a web comprising a set of melt-spun fibers are collected as a fibrous web and optionally subjected to one or more bonding operations to fuse the fibers to each other. Melt-spun fibers are generally larger in diameter than melt-blown fibers.

Polymers suitable for use in a melt blown or melt spinning process include polyolefins such as polypropylene and polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefin, and copolymers and blends thereof.

Non-woven fibers can be made from a thermoplastic semicrystalline polymer, such as a semicrystalline polyester. Useful polyesters include aliphatic polyesters. Non-woven materials based on aliphatic polyester fibers can be especially advantageous in resisting degradation or shrinkage at high temperature applications. This property can be achieved by making the non-woven fibrous layer using a melt blowing process where the melt blown fibers are subjected to a controlled in-flight heat treatment operation immediately upon exit of the melt blown fibers from the multiplicity of orifices. The controlled in-flight heat treatment operation takes place at a temperature below a melting temperature of the portion of the melt blown fibers for a time sufficient to achieve stress relaxation of at least a portion of the molecules within the portion of the fibers subjected to the controlled in-flight heat treatment operation. Details of the in-flight heat treatment are described in U.S. Patent Publication No. 2016/0298266 (Zillig et al.).

Molecular weights for useful aliphatic polyesters need not be particularly restricted and can be in the range of from 15,000 g/mol to 6,000,000 g/mol, from 20,000 g/mol to 2,000,000 g/mol, from 40,000 g/mol to 1,000,000 g/mol, or in some embodiments, less than, equal to, or greater than 15,000 g/mol; 20,000; 25,000; 30,000; 35,000; 40,000; 45,000; 50,000; 60,000; 70,000; 80,000; 90,000; 100,000; 200,000; 500,000; 700,000; 1,000,000; 2,000,000; 3,000,000; 4,000,000; 5,000,000; or 6,000,000 g/mol.

The fibers of the non-woven fibrous layer can have any suitable diameter. The fibers can have a median fiber diameter of from 0.1 micrometers to 10 micrometers, from 0.3 micrometers to 6 micrometers, from 0.3 micrometers to 3 micrometers, or in some embodiments, less than, equal to, or greater than 0.1 micrometers, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 22, 25, 27, 30, 32, 35, 37, 40, 42, 45, 47, 50, 53, 55, 57, or 60 micrometers.

Optionally, at least some of the plurality of fibers in the non-woven fibrous layer are physically bonded to each other or to the heterogeneous filler. In general, this has the effect of increasing stiffness and/or strength to the acoustic article, which may be desirable in certain applications. Conventional bonding techniques include use of heat and pressure applied in a point-bonding process or by passing the non-woven fibrous layer through smooth calendar rolls. Such processes can cause deformation of fibers or compaction of the web, however, which may or may not be desirable.

As another option, attachment between fibers or between fiber and the heterogeneous filler may be achieved by incorporating a binder into the non-woven fibrous layer. In some embodiments, the binder is provided by a liquid or a solid powder. In some embodiments, the binder provided by staple binder fibers, which may be injected into the polymer stream during a melt blowing process. Binder fibers have a melting temperature significantly less than that of remaining structural fibers, and act to secure the fibers to each other.

Other methods for bonding fibers to each other are taught in, for example, U.S. Patent Publication No. 2008/0038976 (Berrigan et al.) and U.S. Pat. No. 7,279,440 (Berrigan et al.). In one technique, a collected web of fibers is exposed to a controlled heating and quenching operation that includes forcefully passing through the web a gaseous stream heated to a temperature sufficient to soften the fibers sufficiently to cause the fibers to bond together at points of fiber intersection, where the heated stream is applied for a time period too short to wholly melt the fibers, and then immediately forcefully passing through the web a gaseous stream at a temperature at least 50° C. less than the heated stream to quench the fibers.

In some embodiments, the fiber polymers have high glass transition temperatures, which can be preferred when the acoustic article is to be used in high temperature environments. Certain non-woven fibrous layers shrink significantly when heated to even moderate temperatures in subsequent processing or use, such as when used as a thermal insulation material. Such shrinkage can be problematic for some applications when the melt-blown fibers include thermoplastic polyesters or copolymers thereof, and particularly those that are semicrystalline in nature.

In some embodiments, the provided non-woven fibrous layers have at least one densified layer adjacent to a layer that is not densified. Either or both of the densified and non-densified layers may be loaded with heterogeneous filler. A densified layer can provide a number of potential benefits. If sufficiently dense, such a layer can be disposed on the outermost surface of the acoustic article and act as a barrier to prevent particles of heterogeneous filler from escaping from the acoustic article. Densification of the non-woven layer can also enhance structural integrity, provide dimensional stability, and enable the non-woven layer to be molded into a three-dimensional shape. Advantageously, a molded acoustic article can assume a customized shape that fully utilizes the space in which it is disposed.

In some embodiments, the densified layer and adjacent non-densified layer are prepared from a monolithic non-woven fibrous layer initially having a uniform density, which is then subjected to heat and/or pressure to create a densified layer on its outermost surface. Methods of producing a densified layer on a non-woven fibrous web, along with further options and advantages, are described in co-pending International Patent Publication No. WO 2019/051761 (You et al.).

In some embodiments, the densified layer has a uniform distribution of polymeric fibers throughout the layer. Alternatively, the distribution of polymeric fibers can be varied across a major surface of the non-woven fibrous layer. Such a construction may be appropriate where, for example, the acoustic response is to be dependent on its location along the major surface.

The median fiber diameters of the densified and non-densified portions of the non-woven fibrous layer can be substantially preserved. The processes described above are generally capable of fusing the fibers to each other in the densified region without significant melting of the fibers. In most instances, it is preferable to avoid melting the fibers to retain the acoustic benefit that derives from the surface area within the densified fiber layer of the non-woven material.

Other non-woven fibrous layers that may be used in the acoustic article include recycled textile fibers, sometimes referred to as shoddy. Recycled textile fibers can be formed into a non-woven structure using an air laid process, in which a wall of air blows fibers onto a perforated collection drum having negative pressure inside the drum. The air is pulled though the drum and the fibers are collected on the outside of the drum where they are removed as a web. Because of the air turbulence, the fibers are not in any ordered orientation and thus can display strength properties that are relatively uniform in all directions.

One or more additional fiber populations can be incorporated into the non-woven fibrous layer. Differences between fiber populations can be based on, for example, composition, median fiber diameter, and/or median fiber length.

For example, a non-woven fibrous layer can include a plurality of first fibers having a median diameter of up to 10 micrometers and a plurality of second fibers having a median diameter of at least 10 micrometers. For various reasons, it can be advantageous to have fibers of different diameters. Inclusion of the thicker second fibers can improve the resiliency of the non-woven fibrous layer, crush resistance, and help preserve the overall loft of the web. The second fibers can be made from any of the polymeric materials previously described with respect to the first fibers and may be made from a melt blown or melt spun process.

In some embodiments, the second fibers are staple fibers that are interspersed with the first plurality of the fibers. These staple fibers can be provided as crimped fibers to improve the overall loftiness of the fibrous web. The staple fibers can include binder fibers, which can be made from any of the above-mentioned polymeric fibers. Structural fibers can include, but are not limited to, any of the above-mentioned polymeric fibers, as well as inorganic fibers such as ceramic fibers, glass fibers, and metal fibers; and organic fibers such as cellulosic fibers.

The first and second fibers can independently have any of the compositions, structures, and properties previously described with respect to the non-woven fibrous layers containing only a single fiber population. Additional features and benefits relating to combinations of the first and second fibers are described in U.S. Pat. No. 8,906,815 (Moore et al.).

Non-woven fibrous layers can provide numerous technical advantages, at least some of which are unexpected. One advantage derives from the surface area of the non-woven fibrous layer. Retention of surface area provided by the fibers, in combination with any heterogeneous filler having a high surface area, enables even a relatively small weight (or thickness) of acoustic material to provide a high level of performance as an acoustic absorber.

These non-woven materials can also be manufactured from fiber materials that can tolerate high temperatures where conventional insulation materials would thermally degrade or fail. This is suitable for insulation materials in automotive and aerospace vehicle applications, which commonly operate in environments that are not only noisy but can reach extreme temperatures. These materials can be highly resilient, enabling them to be compressed and spring back to fill available space within a given cavity. Finally, as described above, these non-woven fibrous layers can also be shaped if so desired to fit a substrate or cavity within a given application, thereby facilitating installation by an operator.

In some embodiments, the porous layer may be disposed on a perforated film that is also porous and has acoustical properties. Perforated films are comprised of a solid layer having a multiplicity of perforations, or through-holes, extending through the solid layer. The perforations allow fluid communication between air spaces on opposing sides of the wall. Microperforated films are perforated films having apertures whose diameters are on the order of micrometers. These perforated films are generally made from polymeric materials, but can also be made from other materials, including metals.

Like the non-woven fibrous layers, perforated films can have configurations that enable them to absorb sound. Conceptually, plugs of air reside within the perforations and act as mass components within a resonant system. These mass components vibrate within the perforations and dissipate sound energy from friction between the plugs of air and the walls of the perforations. If the perforated film is disposed next to an air cavity, dissipation of sound energy may also occur through destructive interference at the entrance of the perforations from sound waves that are reflected back towards the perforations from the opposite direction. Absorption of sound energy occurs with essentially zero net flow of fluid through the acoustic article.

The perforations can have dimensions (e.g. perforation diameter, shape and length) suitable to obtain a desired acoustic performance over a given frequency range. Acoustic performance can be measured, for example, by reflecting sound off of the perforated film and characterizing the decrease in acoustic intensity as compared to the result from a control sample.

In the figures, the perforations are disposed along the entire surface of the perforated film. Alternatively, the wall could be only partially perforated—that is, perforated in some areas but not others.

Compared to other porous layers, perforated films can be made relatively thin while retaining their acoustic absorption properties. Perforated films can have an overall thickness of from 1 micrometer to 2 millimeters, from 30 micrometers to 1.5 millimeters, from 50 micrometers to 1 millimeter, or in some embodiments, less than, equal to, or greater than, 1 micrometer, 2, 5, 10, 20, 30, 40, 50, 100, 200, 500, 700 micrometers, 1 millimeter, 1.1, 1.2, 1.5, 1.7, or 2 millimeters. In embodiments where thickness is not a constraint, a perforated slab is used instead of a perforated film, where the perforated slab has a thickness of up to 3 millimeters, 5, 10, 30, 50, 100, or even 200 millimeters.

The perforations can have a wide range of shapes and sizes and may be produced by any of a variety of molding, cutting or punching operations. The cross-section of the perforations can be, for example, circular, square, or hexagonal. In some embodiments, the perforations are comprised of an array of elongated slits.

While the perforations may have diameters that are uniform along their length, it is possible to use perforations that have the shape of a conical frustum, truncated pyramid, or otherwise have side walls tapered along at least some of their length, as described in co-pending International Patent Publication No. WO 2019/079695 (Lee et al.; see, e.g., FIGS. 15a-c and associated description).

Exemplary perforated film configurations, ways of making the same, and acoustic performance characteristics are described in U.S. Pat. No. 6,617,002 (Wood), U.S. Pat. No. 6,977,109 (Wood), and U.S. Pat. No. 7,731,878 (Wood), U.S. Pat. No. 9,238,203 (Scheibner et al.), and U.S. Patent Publication No. 2005/0104245 (Wood).

Heterogeneous Fillers

The acoustic articles described herein can incorporate one or more heterogeneous fillers that are capable of providing enhanced acoustic properties as part of the acoustical article. Each of the heterogeneous fillers referred to in the embodiments above may independently have distinct characteristics, as described below.

Exemplary heterogeneous fillers are non-porous. The non-porous heterogeneous fillers may have a composition that is organic, inorganic, biomass, or some combination thereof.

Organic compositions include thermoset (i.e., crosslinked) and thermoplastic polymers. Useful thermoset polymers include semicrystalline polymers, such as polyolefins, polyesters, fluoropolymers, and urea formaldehyde polymers. Semicrystalline polyolefins include polyethylene and isotactic polypropylene, semicrystalline polyesters include polyethylene terephthalate, polybutylene terephthalate, and polytrimethyl terephthalate, and semicrystalline fluoropolymers include polytetrafluoroethylene. With respect to urea formaldehyde polymers, there is evidence that the crystalline regions can be beneficial for the hydrolytic stability or water resistance and advanced mechanical properties of the resin.

Inorganic compositions include any of a number of mineral compositions, including oxides, hydroxides, carbonates, silicates, and sulfates. Useful carbonates include, for example, limestone and dolomite. Useful oxides include aluminum oxide, silicon dioxide, and zirconium oxide. Useful hydroxides include aluminum oxyhydroxide. Useful silicates include feldspar, calcined phyllosilicate, and silicate glasses.

Non-porous biomass can include organic or inorganic compositions or both. The processes that form biomass often involve the integration of multiple organic and inorganic components that may be polymeric, or amorphous or even crystalline minerals.

Fillers may, in some cases, be aggregated (i.e. agglomerated) or substantially non-aggregated. Primary filler particles may be aggregated to each other by particle-to-particle interactions. Such interactions can derive from secondary bond forces or electrostatic forces. In some embodiments, at least some of the polymer particles are sintered together under slight pressure and heat to form agglomerates. The heat may be provided using any known method, including steam, high-frequency radiation, infrared radiation, or heated air. Aggregation of particles may also be achieved by using adhesives or binders. In some embodiments, the particle aggregates themselves can be processed to be substantially non-porous.

Particle aggregates may be regularly or irregularly shaped. Preferably, aggregates stay together in intended use with most particles retaining their specified dimensions but are not necessarily crushproof. In some embodiments, the pores within the acoustic article can be borne entirely from the interstitial spaces created within aggregates of the primary filler particles.

The heterogeneous fillers above, independently, can have any suitable median particle size. Filler particles can be sized to create interstitial voids having a desired size distribution when incorporated into a given porous layer. Such voids can represent spaces between and amongst filler particles, non-woven fibers (if present), polymeric or inorganic struts (if present), or combinations thereof. Median particle size of the filler particles is a parameter that can also be used to adjust the permeability (and overall flow resistance) of the acoustic article.

The heterogeneous filler can have a median particle size of from 100 micrometer to 1000 micrometers, from 150 micrometer to 800 micrometers, from 200 micrometers to 700 micrometers, or in some embodiments, less than, equal to, or greater than 100 micrometer, 110, 120, 130, 140, 150, 160, 170, 180, 190, 200, 220, 250, 270, 300, 350, 400, 450, 500, 600, 700, 800, 900, or 1000 micrometers.

The heterogeneous fillers disposed within a given porous layer can have any suitable particle size distribution to provide a desired acoustic response. The particle size distribution may be uniform or non-uniform. The particle size distribution may be unimodal or multimodal, independently of how many heterogeneous filler compositions are present in the porous layer. The heterogeneous filler can have a D50/D90 particle size ratio of from 0.25 to 1, 0.3 to 0.9, 0.4 to 0.8, or in some embodiments, less than, equal to, or greater than 0.25, 0.3, 0.35, 0.4, 0.45, 0.5, 0.55, 0.6, 0.65, 0.7, 0.75, 0.8, 0.85, 0.9, 0.95, or 1.

D50 and D90 can be defined by the number-average size distribution of particles as determined via image analysis of optical or electron micrographs. For optical measurements, this can take place in static conditions or in dynamic conditions, such as in the imaging of particles in a flowing fluid. Assuming a number-average distribution, D50 refers to the median particle diameter and D90 refers to the particle diameter for which 90% of the total number of filler particles would have a smaller diameter. For image analysis, one can calculate the particle size by different metrics, such as the minimum diameter, maximum diameter, and the circle equivalent diameter. The latter is the diameter of a circle with an equivalent area to that of the measured area occupied by a given particle in an image. One can also adjust such a distribution by using sieving to exclude particles of certain diameters. Sieving can also be used to determine a weight-averaged size distribution.

The heterogeneous fillers above, independently, can have a specific surface area that is characteristic of filler particles having a generally smooth outer surface or one that is marked by some surface roughness that does not extend into the bulk of the particle. The specific surface area of the heterogeneous filler can be from 0.01 $m^2/g$ to 1 $m^2/g$, from 0.05 $m^2/g$ to 0.8 $m^2/g$, from 0.1 $m^2/g$ to 0.5 $m^2/g$, or in some embodiments, less than, equal to, or greater than 0.01 $m^2/g$, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or 1 $m^2/g$.

Surface area can be measured based on the sorption of either nitrogen or krypton gas at liquid nitrogen temperatures onto the surface of a given material. These measurements can be performed using an instrument known a gas sorption analyzer. In this measurement, one can generate an isotherm (volume of gas adsorbed at standard temperature and pressure per unit mass versus relative pressure) by dosing a sample with gas. Then, by applying a modified form of the Langmuir equation known as the Brunauer-Emmett-Teller (BET) equation to the isotherm, it is possible to calculate the specific surface area. This value is known as the BET specific surface area. In some embodiments, the specific surface area, as referred to herein, is the BET specific surface area.

In some embodiments, the acoustic article includes a blend where two or more heterogeneous fillers are included. Such additional heterogeneous fillers can be other non-porous filler particles that differ in size, shape or composition. Such additional heterogeneous filler can also include any of the porous heterogeneous filler particles disclosed in co-pending International Patent Application No. PCT/IB2020/053471 (Mok et al.).

Bonding of the heterogeneous filler to a porous layer can be facilitated by modification of the particle surfaces via silanes or other metal or metalloid complexes. Depending on the functionalities present, either inter- or intramolecular bonding to the layer can be achieved. Polymeric heterogeneous fillers (or aggregates that contain a polymeric binder) can be modified by a variety of routes, including various forms of grafting, solvent-treatment, and e-beam irradiation. These modifications can also facilitate bonding of particles to the porous layer.

Methods of Manufacture

The provided acoustic articles can be assembled using any of a number of suitable manufacturing methods.

For embodiments in which the porous layer is a non-woven fibrous web, heterogeneous filler can be incorporated into the constituent fibers either during or after the direct formation of the fibers. Where the non-woven fibrous web is made using a melt blowing process, for example, the heterogeneous filler may be conveyed and co-mingled with the streams of molten polymer as they are blown onto a rotating collector drum. The heterogeneous filler may be entrained within a flow of heated air that converges with the hot air used to attenuate the melt blown fibers. An exemplary process is described in U.S. Pat. No. 3,971,373 (Braun). In a similar fashion, particles of heterogeneous filler can be conveyed into an air laid process, such as the process use to manufacture porous layers made from recycled textile fibers (i.e., shoddy).

Heterogeneous filler can also be added after the non-woven fibrous layer has been made. For example, the porosity of the non-woven fibrous layer could enable the heterogeneous filler to infiltrate into its interstitial spaces by homogeneously dispersing the heterogeneous filler into a liquid medium such as water, followed by roll coating or slurry coating the particle-filled medium onto the non-woven porous layer. The heterogeneous filler could also be printed, for instance by screen printing, from a homogeneous dispersion. As an alternative to using a liquid medium, one can entrain the heterogeneous filler in a gaseous stream, such as an air stream, and then direct the stream toward the non-woven layer to fill it.

Alternatively, heterogeneous filler can also be enmeshed into the porous layer by agitation. In one embodiment of this method, a non-woven fibrous layer is placed over a flat surface and a cylindrical conduit placed over it to define a coating area. Particles of the heterogeneous filler can then be poured into the conduit and the assembly agitated until the particles are fully migrated into the non-woven structure through its open pores. A similar method may be used for porous layers comprised of open-celled foams.

Construction of multilayered acoustic articles and attachment to substrates can include one or more lamination steps. Lamination may be achieved using an adhesive bond. Preferably, any adhesive layers used do not interfere with sound penetration into the absorbing layer. Alternatively, or in combination, physical entanglement of fibers may be used to improve interlayer adhesion. Mechanical bonds, using fasteners for example, are also possible.

The acoustic articles can also be edge sealed to prevent particle egress. Such containment could be achieved by densifying the edges, filling edges with a resin, quilting the acoustic article, or fully encasing the acoustic article in a sleeve, such as constructed from an airflow transparent scrim as described previously, to prevent particle movement or egress. Edge sealing can be desirable to improve product lifetime, durability, and facilitate handling and mounting. Edge sealing can also be performed for aesthetic reasons.

In yet another embodiment, a non-woven fibrous layer can be sequentially sprayed with an adhesive and then with the filler particles. In some instances, the adhesive may be provided in the form of hot melt fibers.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

All materials are commercially available, for example from Sigma-Aldrich Chemical Company, St. Louis, MO, USA, or known to those skilled in the art, unless otherwise stated or apparent.

The following abbreviations are used in this section: mL=milliliters, g=grams, lb=pounds, m=meters, cm=centimeters, mm=millimeters, µm=micrometers, wt %=percent by weight, sec=seconds, min=minutes, h=hours, N=newtons, Hz=hertz, gsm=grams per square meter. Abbreviations for materials used in this section, as well as descriptions of the materials, are provided in Table 1.

TABLE 1

| Raw Materials | | |
|---|---|---|
| Designation | Description | Source |
| MF650Y | Polypropylene metallocene homopolymer resin obtained under the trade designation "METOCENE MF650Y" | LyondellBasell Industries, Houston, TX |
| M3766PP | Polypropylene isotactic homopolymer resin obtained under the trade designation "M3766" | Total Petrochemicals & Refining USA, Inc., Houston, TX |
| KOWA | PJAC steam-activated coconut shell carbon granules, sieved by the manufacturer between 40 and 140 US mesh size, obtained under the trade designation "PJ40140-233TM" | Philippine-Japan Active Carbon Corporation., Davao City, Philippines |
| SSORB | Granular Type A silica gel, obtained under the trade designation "SSORB WHITE SILICA GEL, AW0210G" | InterraGlobal Corp., Park Ridge, IL |
| Acrylic 60 × 100 | Acrylate-based polymeric abrasive blasting material sieved between 60 and 100 US mesh size, obtained under the trade designation "TYPE V ACRYLIC PLASTIC MEDIA" | Composition Materials Co. Inc., Milford, CT |
| UF 20 × 40 | Urea-formaldehyde polymeric abrasive blasting material sieved between 20 and 40 US mesh size, obtained under the trade designation "TYPE II UREA PLASTIC MEDIA" | Composition Materials Co. Inc., Milford, CT |
| UF 30 × 40 | Urea-formaldehyde polymeric abrasive blasting material sieved between 30 and 40 US mesh size, obtained under the trade designation "TYPE II UREA PLASTIC MEDIA" | Composition Materials Co. Inc., Milford, CT |
| UF 40 × 60 | Urea-formaldehyde polymeric abrasive blasting material sieved between 40 and 60 US mesh size, obtained under the trade designation "TYPE II UREA PLASTIC MEDIA" | Composition Materials Co. Inc., Milford, CT |
| UF 60 × 100 | Urea-formaldehyde polymeric abrasive blasting material sieved between 60 and 100 US mesh size, obtained under the trade designation "TYPE II UREA PLASTIC MEDIA" | Composition Materials Co. Inc., Milford, CT |
| Polyester 40 × 60 | Polyester polymeric abrasive blasting material sieved between 40 and 60 US mesh size, obtained under the trade designation "TYPE I POLYESTER PLASTIC MEDIA" | Composition Materials Co. Inc., Milford, CT |
| Glass Beads | Glass bead abrasive material sieved between 70 and 100 US mesh size, obtained under the trade designation "GLASS BEADS SIZE 8" | Composition Materials Co. Inc., Milford, CT |
| Aluminum Oxide | Inorganic fused alumina abrasive material sieved to 80 grit (as specified by the Coated Abrasives Manufacturing Institute), obtained under the trade designation "ALUMINUM OXIDE SIZE #80" | Composition Materials Co. Inc., Milford, CT |

Particle Sieving

Two Retsch (Retsch GmbH, Haan, Germany) wire mesh screens with openings of 100 and 710 microns were stacked and loaded with SSORB. The screens, a lid, and a catch pan were placed into a sieve shaker (obtained under the trade name "AS 200" from Retsch GmbH). Portions of SSORB were agitated at a setting of 1 mm (double the vibration amplitude) for 10 minutes, and the portion between 100 and 710 microns was kept as PE-12.

KOWA was classified using wire mesh screens having 90, 212, 310, and 425 micron openings in a 60 inch (152.4 cm) diameter round vibratory screener (SWECO, Florence, KY). The screening rate of the material in the separator was adjusted using eccentric weights on the motion generator shaft to 1 lb/min (2.2 kg/min). The fraction between 212 and 310 microns was used as PE-10 and a mixture of 25 wt % each of fractions 90-212, 212-310, 310-425 and >425 microns was used as PE-11.

Surface Area

Surface area for PE-1 through PE-8 was measured using a gas sorption analyzer (obtained under the trade designation "ASAP 2020" from Micromeritics Instrument Corp., Norcross, GA). Specimens were loaded into 12 mm diameter sample tubes and all materials were outgassed at <100 mTorr for at least 12 hours at 75° C. Helium was used for void volume determination. Isotherms were measured using krypton gas at 77 K using a liquid nitrogen bath. The multipoint Brunauer-Emmett-Teller equation was carried out in the range from (0.05 to 0.2 P/Po). Results are presented in Table 4.

Surface area for PE-9 and PE-12 was measured using a gas sorption analyzer (obtained under the trade designation "AUTOSORB IQ2-MP" from Anton Paar QuantaTec Inc., Boynton Beach, FL). Specimens were loaded into 9 mm diameter sample tubes and were outgassed at <100 mTorr for at least 12 hours at 150° C. Helium was used for the void volume determination, which was performed periodically during the measurement. Isotherms were measured using nitrogen gas at 77 K using a liquid nitrogen bath. Quenched-state density functional theory (QSDFT) was used to analyze the isotherm for PE-2 with carbon as the adsorbent, nitrogen at 77 K as the adsorbate, and slit-like pore geometry. The supplied ASiQwin software (version 5.21) was used for the analyses. Non-local density function theory (NLDFT) was used to analyze the isotherm for PE-12 with silica as the adsorbent, nitrogen at 77 K as the adsorbate, and a cylindrical pore geometry. Total pore volume was calculated using a point on the adsorption branch taken at ~0.995 P/Po (where P is the pressure and Po is the saturation pressure). Results are presented in Table 5.

Optical Microscopy Size Distribution Analysis

Particle dimensions (for all materials except PE-8) were measured using an optical microscope (obtained under the trade designation "VHX-6000" from Keyence Corp, Osaka, JP) in dark field reflection mode. At least 200 particles were measured for average maximum diameter and average circle equivalent diameter. The supplied software was used to analyze the particles. Results are presented in Table 2.

Scanning Electron Microscopy Size Distribution Analysis

Particle dimensions for PE-8 were measured using a scanning electron microscope (obtained under the trade designation "TM3000" from Hitachi High Technologies America, Inc, Schaumburg, IL). Images were taken using the "Analysis" current and voltage settings. Images were analyzed via the software package ImageJ (version 1.53e available from the United States National Institutes of Health, Bethesda, MD). At least 200 particles were measured for their maximum diameter and circle equivalent diameter. Results are presented in Table 2.

Sieve Size Distribution Analysis

The size distribution via sieving of PE-1 through PE-9 and PE-12 was obtained by following ASTM D2862-16, with the exception that step 7.2.1 was omitted. Bulk densities were determined as described in "Bulk Density," below. A set of wire mesh screens (Retsch GmbH, Haan, Germany) with openings between 100 and 710 microns in ~100 micron increments were used. The sieves, a lid, and a catch pan were placed into a sieve shaker (obtained under the trade name "AS 200" from Retsch GmbH). They were agitated at a setting of 1 mm for 10 minutes. Results are presented in Table 3.

Bulk Density

Bulk densities of PE-1 through PE-12 were measured following ASTM D2854-09. Particles were delivered into a graduated cylinder using a vibratory feeder with a 15 mm chute (obtained under the trade name "DR 100 Vibratory Feeder from Retsch GmbH). Results are presented in Table 2.

Skeletal Density

Skeletal densities were measured for PE-1 through PE-9 and PE-12 following ASTM D5550-14, with the exception that the grinding step described in 10.2 was omitted because the particles were fine and/or nonporous. Moisture removal was performed in a moisture analyzer (obtained under the trade name PMC 110 from Radwag USA L.L.C. North Miami Beach, FL) at 110° C. until equilibrium was reached. For the pycnometry, a helium pycnometer (obtained under the trade designation "ACCUPYC 1340 II TEC" from Micromeritics, Norcross, GA) was used. Prior to obtaining measurements, the instrument was calibrated for measured volume using a metal ball of a specified, traceable volume. A 3.5 cc cup was used for the measurements and measurements were taken at ambient temperature. Results are presented in Table 2.

The KOWA (valid for both PE-10 and PE-11) was measured following ASTM D2638-10, wherein the KOWA was ground in a jar mill containing deionized water and coarse alumina milling media for 24 hours. After milling, the material was dried. For D2638-10, moisture was removed for 42 hours at 150° C. in a convection oven. For the pycnometry, a helium pycnometer (obtained under the trade designation "ACCUPYC 1340 II TEC" from Micromeritics, Norcross, GA) was used. Prior to obtaining measurements, the instrument was calibrated for measured volume using a metal ball of a specified, traceable volume. A 3.5 cc cup was used for the measurements and measurements were taken at ambient temperature. Results are presented in Table 2.

Integration of Fillers into Blown Microfibers (BMF)

Nonwoven melt blown webs were prepared by a process similar to that described in Wente, Van A., "Superfine Thermoplastic Fibers" in Industrial Engineering Chemistry, Vol. 48, pages 1342 et seq. (1956), and in Report No. 4364 of the Naval Research Laboratories, published May 25, 1954 entitled "Manufacture of Superfine Organic Fibers" by Wente, Van. A. Boone, C. D., and Fluharty, E. L., except that a drilled die was used to produce the fibers. A polypropylene resin ("MF650Y") was extruded through the die into a high velocity stream of heated air which drew out and attenuated polypropylene blown microfibers prior to their solidification and collection. If used, filler indicated in Tables 8, 10, 12, 14, and 16 was fed into the stream of polypropylene blown microfibers, according to the method of U.S. Pat. No. 3,971,373 (Braun). The blend of polypropylene blown microfibers and filler, if used, was collected in a random fashion on a nylon belt. The web was then removed from the nylon belt. For articles comprising one base web, filler loading (wt %) was calculated as the ratio of the difference between the total web basis weight and the base web basis weight to the total web basis weight, multiplied by 100%. For example, if the base web basis weight was 400 gsm and the total basis weight was 600 gsm, the filler loading (wt %) would be calculated as:

$$(600\ \text{gsm}-400\ \text{gsm})/600\ \text{gsm}\times 100\%=33.3\%$$

For articles comprising more than one base web, filler loading (wt %) was calculated as the ratio of the sum of differences between total web basis weight and web basis weight for each web to the total basis weight measured for the article, multiplied by 100%. For example, for a sample comprising a first web with base web basis weight of 400 gsm and a total basis weight of 600 gsm and a second web with base web basis weight of 425 gsm and a total basis weight of 590 gsm, and an article total basis weight of 1195 gsm, the filler loading (wt %) would be calculated as:

$$((600-400)+(590-425))/1195\ \text{gsm}=30.5\%$$

Filler loading is reported in Tables 8, 10, 12, 14, 16, 17 and 18.

Basis Weight Measurement

Basis weight of webs without fillers was determined by measuring 5.25 in (13.34 cm) diameter circular discs. These results are presented as "Base Web Basis Weight (gsm)" in Tables 8, 12, 14 and 16. Basis weight of webs with fillers were determined by measuring 1.20 $m^2$ of material. These results are presented as "Total Web Basis Weight (gsm)" in Tables 8, 12, 14 and 16.

Solidity and Filler Volume Loading (%)

Fiber solidity was calculated based on Equation 1. Polymer density for polypropylene is 0.91 g/cc.

$$\text{Fiber Solidity (\%)} = \frac{BMF\text{ Volume}}{\text{Sample Volume}} = \frac{\dfrac{\text{Weight \% } BMF * \text{Web Weight (g)}}{\text{Polymer Densiy}\left(\frac{g}{m^3}\right)}}{\text{Web Thickess }(m) * \text{Web area }(m^2)} \quad (1)$$

Heterogeneous filler solidity or loading was calculated based on Equation 1. Particle density is taken to be the skeletal density.

$$\text{Heterogeneous Filler Solidity (\%)} = \frac{\text{Particle Volume}}{\text{Sample Volume}} = \frac{\dfrac{\text{Weight \% Particles} * \text{Web Weight (g)}}{\text{Particle Density}\left(\frac{g}{m^3}\right)}}{\text{Web Thickess }(m) * \text{Web area }(m^2)} \quad (2)$$

Nonwoven Thickness Test 1

The sample thickness of a 5.25 in (13.34 cm) disc was measured using a thickness testing gauge having a tester foot with dimensions of 5 cm×12.5 cm at an applied pressure of 150 Pa.

Nonwoven Thickness Test 2

The sample thickness of strips with dimensions of 1.2 m×0.2 m was measured using a thickness tester (obtained under the trade designation "GUSTIN-BACON MEASURE-MATIC" from CERTAINTEED, Malvern, PA) having an attached analog dial indicator. A 130.14 g weight was used to give an applied pressure of 2 Psi (14 kPa). For a given material, two strips were measured. For each of the strips, the thickness of the two ends (lengthwise) were measured and the values were averaged. The measurements from each of the two strips were then averaged to provide the reported value. Results are presented in Tables 8, 10, 12, 14 and 16.

Pressure Drop Test

A high-speed automated filter tester (obtained under the trade designation "8130" from TSI Inc., Shoreview, MN) was operated with particle generation and measurement turned off. Flowrate was adjusted to 85 liters per minute (LPM) and a 5.25 in (13.34 cm) diameter sample was used. The sample was placed onto the lower circular plenum opening and the tester was engaged. A pressure transducer (obtained from MKS Instruments, Inc., Andover, MA) within the device measured the pressure drop in mm $H_2O$.

Airflow Resistance (AFR) Testing

Airflow resistance was measured from a 47 mm disk using a 44.44 mm holder according to ASTM C-522-03 (Reapproved 2009), "Standard Test Method for Airflow Resistance of Acoustical Materials". The instrument used was using a static airflow resistance meter" (obtained under the trade designation "SIGMA" running "SIGMA-X" software from Mecanum, Sherbrooke, Canada). Results are reported in units of MKS Rayls in Tables 7, 8, 10, 12, 14, and 16.

Effective Fiber Diameter

Results are presented in Tables 8, 12, 14, and 16.

Acoustic Measurements

Acoustic articles were made with webs and either filler (PE-10 or PE-4) or no filler, as indicated in Table 16, at three thickness indicated in Table 16. Articles were testing using an impedance tube and ALPHA CABIN.

Samples containing fillers and BMF were tested for sound absorption according to SAE J2883 "Laboratory Measurement of Random Incidence Sound Absorption Tests Using a Small Reverberation Room". The reverberation room used was available under the trade designation "ALPHA CABIN" and obtained from Autoneum, Winterthur, Switzerland. In the test, 1.20 $m^2$ of material was used in a 10 mm, 15 mm or 30 mm frame at 22° C. and 55-56% humidity. Samples were re-lofted overnight by keeping them unrolled and lying flat on a table, unless otherwise noted. Unless otherwise noted, webs were tested with the side that had been facing the collector drum, when made, facing upward in the ALPHA CABIN. Acoustic absorption results using this procedure are presented in Tables 9, 11, 13, 15, and 17.

Normal incident acoustical absorption was according to ASTM E1050-12, "Standard Test Method for Impedance and Absorption of Acoustical Materials Using a Tube, Two Microphones and a Digital Frequency Analysis System". An impedance tube kit (available under the trade designation TYPE 4206 from Brüel & Kjær, Naerum, Denmark) was used with the sample configurations noted below. The impedance tube was 63 mm in diameter and oriented vertically, with the microphones above the sample chamber. The normal incident absorption coefficient was reported with respect to one third octave band frequency using the abbreviation "a." Sample discs were punched out using a 63-mm punch and the sample chamber was set to a depth equivalent to the thickness of the media. Unless otherwise noted, discs were tested with the side that had been facing the collector drum, when made, facing the microphones in the sample chamber. Acoustic absorption results using this procedure are presented in Table 18.

The samples were tested as either a single layer or stacked in different configurations indicated in Tables 17 and 18. In both tests, the articles were tested with the side facing away from the collector drums, as made, towards the microphone. When samples were stacked for acoustic measurements, as indicated in Tables 17 and 18, they were stacked in order of their thickness with the thickest sample at the base of a stack and the thinnest sample at the top facing the microphones and speakers.

Preparation of Airflow Resistive Scrims

Nonwoven spunbond webs were prepared from polypropylene resin ("M3766PP", Total Petrochemicals) using a process similar to that described in U.S. Pat. Nos. 6,916,752, 8,240,484, and U.S. Ser. No. 10/273,612. For webs PE-13 and PE-14, measurements of basis weight, effective fiber diameter and pressure drop were made and results are reported in Table 6.

PE-13 and PE-14 were fed through a calendaring process employing a smooth rubber calendaring roll in combination with a smooth metal backing roll. The backing roll temperature was operated at 210° F. (99° C.) and line speed and roll pressures are noted in Table 7. The airflow resistance of the calendared samples PE-15 and PE-16 is reported in Table 7.

Samples with Added Scrims

The porous layer of EX 4 was evaluated by ALPHA CABIN acoustic absorption testing with the addition of one (EX-9) or two (EX-10) airflow resistive scrims (either PE 15 or 16, as indicated in Table 10) on top of the porous layer, on the surface facing the microphone and speaker of the testing chamber. Table 10 provides information on the acoustic articles comprising EX 4 and scrims. Table 11 shows the acoustic absorption measured as described in "ALPHA CABIN."

TABLE 2

Characteristics of Preparative Examples

| | | Optical Microscopy Size Analysis | | | | Density | |
|---|---|---|---|---|---|---|---|
| Preparative Example | Sample | Average Max Diameter (μm) | Standard Deviation Max Diameter (μm) | Average Circle Equiv. Diameter (μm) | Standard Deviation Circle Equiv. Diameter (μm) | Bulk Density (g/mL) | Skeletal Density (g/mL) |
| PE-1 | UF 20 × 40 | 822 | 352 | 628 | 258 | 0.77 | 1.53 |
| PE-2 | UF 30 × 40 | 829 | 182 | 633 | 115 | 0.74 | 1.52 |
| PE-3 | UF 40 × 60 | 606 | 126 | 451 | 82 | 0.75 | 1.54 |
| PE-4 | UF 60 × 100 | 319 | 82 | 203 | 53 | 0.76 | 1.49 |
| PE-5 | Polyester 40 × 60 | 633 | 160 | 382 | 98 | 0.68 | 1.24 |
| PE-6 | Acrylic 60 × 100 | 339 | 95 | 241 | 51 | 0.44 | 1.19 |
| PE-7 | Aluminum Oxide | 360 | 61 | 274 | 42 | 2.16 | 3.97 |
| PE-8 | Glass Beads | 115 | 36 | 105 | 33 | 1.61 | 2.49 |
| PE-9 | KOWA | 336 | 80 | 262 | 54 | 0.55 | NA |
| PE-10 | KOWA* | 346 | 82 | 267 | 57 | 0.46 | NA |
| PE-11 | KOWA** | 287 | 123 | 225 | 93 | 0.51 | NA |
| PE-12 | SSORB | 566 | 317 | 424 | 234 | 0.81 | 2.09 |

*Sieved between 212 and 310 microns

**Mixture of 25 wt % each of the following sieved fractions: 90-212, 212-310, 310-425 and >425 microns

TABLE 3

Size Distribution of Fillers Via Sieving

| Example | Sample | <100 μm | 100-200 μm | 200-300 μm | 300-400 μm | 400-500 μm | 500-600 μm | 600-700 μm | >700 μm |
|---|---|---|---|---|---|---|---|---|---|
| PE-1 | UF 20 × 40 | 0 | 0 | 0 | 7 | 22 | 19 | 13 | 39 |
| PE-2 | UF 30 × 40 | 0 | 0 | 0 | 13 | 56 | 31 | 0 | 0 |
| PE-3 | UF 40 × 60 | 0 | 0 | 27 | 72 | 1 | 0 | 0 | 0 |
| PE-4 | UF 60 × 100 | 0 | 69 | 31 | 0 | 0 | 0 | 0 | 0 |
| PE-5 | Polyester 40 × 60 | 0 | 1 | 18 | 44 | 36 | 1 | 0 | 0 |
| PE-6 | Acrylic 60 × 100 | 0 | 49 | 50 | 0 | 0 | 1 | 0 | 0 |
| PE-7 | Aluminum oxide | 0 | 5 | 79 | 16 | 0 | 0 | 0 | 0 |
| PE-8 | Glass Beads 70 × 100 | 2 | 15 | 83 | 0 | 0 | 0 | 0 | 0 |
| PE-9 | KOWA | 0 | 1 | 18 | 44 | 36 | 1 | 0 | 0 |
| PE-12 | SSORB | 0 | 1 | 18 | 44 | 36 | 1 | 0 | 0 |

TABLE 4

Surface Area Characterization of Nonporous Fillers via the Ue of Kr

| Ex. | Specific Surface Area (MBET, Kr, 77K, $m^2/g$) |
|---|---|
| PE-1 | 0.0803 |
| PE-2 | 0.0689 |
| PE-3 | 0.1561 |
| PE-4 | 0.1131 |
| PE-5 | 0.0520 |
| PE-6 | 0.3383 |
| PE-7 | 0.0384 |
| PE-8 | 0.0252 |

TABLE 5

Surface Area/Pore Volume Characterization of Porous Fillers

| Ex. | Specific Surface Area (DFT, N2, 77K, $m^2/g$) | Micropore Volume (DFT $N_2$, 77K, mL/g)* | Micropore Surface Area (DFT $N_2$, 77K, $m^2/g$)* | Pore Volume ($N_2$, 77K, mL/g) | Mode Pore Size (DFT $N_2$, 77K, nm) |
|---|---|---|---|---|---|
| PE-9** | 1111 | 0.42 | 1109 | 0.43 | 0.61 |
| PE-12 | 751 | 0.15 | 490 | 0.39 | 1.43 |

*Under 2 nm or closest bin point (2.03 nm for SSORB)

**Note-

Data representative of PE-10 and PE-11, as well.

TABLE 6

| Basis Weight, EFD and PD of Scrims | | | |
|---|---|---|---|
| Sample | Basis Wt (gsm) | EFD (μm) | PD (mm $H_2O$) |
| PE-13 | 115 | 16 | 5.6 |
| PE-14 | 140 | 18 | 2.7 |

TABLE 7

| Roll Pressure, Line Speed, and AFR of Scrims | | | | |
|---|---|---|---|---|
| Calendared Sample | Input Sample | Roll Pressure | Line Speed (m/min) | AFR (MKS Rayls) |
| PE-15 | PE-13 | 200 PLI (35 N/mm) | 1.52 | 1090 |
| PE-16 | PE-14 | 300 PLI (53 N/mm) | 0.91 | 1060 |

TABLE 8

| Basis Weights, EFD, Filler Loadings, Thicknesses and AFR of Acoustic Articles | | | | | | | | | |
|---|---|---|---|---|---|---|---|---|---|
| EXAMPLE | Filler | Base Web Basis Weight (gsm) | EFD (μm) | Total Web Basis Weight (gsm) | Solidity of Fiber Phase (%) | Filler Loading (wt %) | Filler Loading (vol %) | Thickness Test 2 (mm) | AFR (MKS Rayls) |
| CE-1* | None | 519 | 6.4 | 529 | 9.5 | N/A | N/A | 6 | 5550 |
| CE-2 | None | 763 | 4.6 | 763 | 7.4 | N/A | N/A | 11.3 | 10920 |
| CE-3* | PE-11 | 546 | 5.2 | 820 | 6.0 | 33.4 | 1.3 | 10.0 | 4040 |
| CE-4 | PE-10 | 528 | 4.9 | 773 | 5.6 | 31.7 | 1.1 | 10.4 | 7120 |
| CE-5 | PE-12 | 521 | 5.8 | 922 | 5.5 | 43.5 | 1.9 | 10.4 | 4550 |
| CE-6 | None | 745 | 7.8 | 766 | 9.2 | N/A | N/A | 8.9 | 3140 |
| CE-7 | PE-10 | 530 | 8.3 | 815 | 5.8 | 35.0 | 1.3 | 10.1 | 2430 |
| EX-1 | PE-1 | 526 | 5.6 | 831 | 5.0 | 36.7 | 1.7 | 11.5 | 4285 |
| EX-2 | PE-2 | 523 | 5.5 | 871 | 5.0 | 40.0 | 2.0 | 11.6 | 4295 |
| EX-3 | PE-3 | 526 | 6.1 | 873 | 6.0 | 39.7 | 2.3 | 9.7 | 3230 |
| EX-4 | PE-4 | 501 | 6.1 | 857 | 5.3 | 41.5 | 2.3 | 10.3 | 2720 |
| EX-5 | PE-6 | 530 | 4.8 | 738 | 5.5 | 28.2 | 1.6 | 10.6 | 7500 |
| EX-6 | PE-5 | 517 | 6.0 | 820 | 5.9 | 37.0 | 2.5 | 9.7 | 4160 |
| EX-7 | PE-8 | 530 | NT* | 1382 | 5.6 | 61.6 | 3.3 | 10.4 | 8400 |
| EX-8 | PE-7 | 534 | 4.8 | 1224 | 6.1 | 56.4 | 1.8 | 9.6 | 6690 |
| EX-9 | PE-6 | 526 | 8.2 | 758 | 5.7 | 30.6 | 1.9 | 10.1 | 2690 |

*Indicates that material was not relofted
*Target of 5-6 EFD
N/A = not applicable; no filler used

TABLE 9

| Absorption of Acoustic Articles in Alpha Cabin | | | | | | | | | | | | | | | |
|---|---|---|---|---|---|---|---|---|---|---|---|---|---|---|---|
| Frequency [Hz] | 400 | 500 | 630 | 800 | 1,000 | 1,250 | 1,600 | 2,000 | 2,500 | 3,150 | 4,000 | 5,000 | 6,300 | 8,000 | 10k |
| CE-1* | 0.03 | 0.06 | 0.12 | 0.24 | 0.48 | 0.76 | 0.87 | 0.89 | 0.89 | 0.81 | 0.82 | 0.81 | 0.83 | 0.83 | 0.86 |
| CE-2 | 0.13 | 0.37 | 0.75 | 1.04 | 0.86 | 0.77 | 0.71 | 0.73 | 0.77 | 0.79 | 0.82 | 0.81 | 0.83 | 0.84 | 0.85 |
| CE-3* | 0.20 | 0.51 | 0.84 | 0.99 | 0.95 | 0.95 | 0.89 | 0.88 | 0.87 | 0.85 | 0.86 | 0.84 | 0.87 | 0.89 | 0.91 |
| CE-4 | 0.11 | 0.27 | 0.45 | 0.79 | 0.95 | 0.99 | 0.95 | 0.94 | 0.92 | 0.87 | 0.88 | 0.87 | 0.90 | 0.92 | 0.95 |
| CE-5 | 0.16 | 0.39 | 0.63 | 0.82 | 0.89 | 0.93 | 0.89 | 0.89 | 0.89 | 0.86 | 0.87 | 0.86 | 0.89 | 0.90 | 0.93 |
| CE-6 | 0.15 | 0.29 | 0.42 | 0.64 | 0.81 | 0.94 | 0.95 | 0.95 | 0.94 | 0.89 | 0.89 | 0.87 | 0.89 | 0.91 | 0.93 |
| CE-7 | 0.16 | 0.32 | 0.45 | 0.67 | 0.84 | 0.94 | 0.98 | 1.01 | 1.01 | 0.97 | 0.96 | 0.94 | 0.95 | 0.95 | 0.96 |
| EX-1 | 0.17 | 0.40 | 0.63 | 0.87 | 0.96 | 1.03 | 1.02 | 1.01 | 0.98 | 0.95 | 0.93 | 0.93 | 0.95 | 0.95 | 0.97 |
| EX-2 | 0.19 | 0.47 | 0.72 | 0.92 | 0.97 | 1.00 | 0.97 | 0.99 | 0.97 | 0.96 | 0.94 | 0.93 | 0.97 | 0.96 | 0.98 |
| EX-3 | 0.13 | 0.32 | 0.53 | 0.79 | 0.90 | 0.93 | 0.90 | 0.88 | 0.87 | 0.84 | 0.86 | 0.85 | 0.88 | 0.90 | 0.90 |
| EX-4 | 0.15 | 0.37 | 0.62 | 0.88 | 0.92 | 0.93 | 0.88 | 0.86 | 0.86 | 0.84 | 0.86 | 0.86 | 0.89 | 0.89 | 0.92 |
| EX-5 | 0.12 | 0.32 | 0.57 | 0.92 | 0.96 | 0.93 | 0.88 | 0.85 | 0.86 | 0.83 | 0.85 | 0.85 | 0.88 | 0.89 | 0.89 |
| EX-6 | 0.11 | 0.29 | 0.48 | 0.76 | 0.89 | 0.92 | 0.89 | 0.87 | 0.86 | 0.83 | 0.84 | 0.84 | 0.86 | 0.89 | 0.89 |
| EX 7 | 0.17 | 0.46 | 0.68 | 0.73 | 0.76 | 0.79 | 0.78 | 0.79 | 0.81 | 0.79 | 0.81 | 0.80 | 0.83 | 0.86 | 0.87 |
| EX 8 | 0.16 | 0.43 | 0.66 | 0.75 | 0.79 | 0.81 | 0.79 | 0.80 | 0.82 | 0.80 | 0.83 | 0.84 | 0.87 | 0.88 | 0.88 |
| EX 9 | 0.18 | 0.34 | 0.48 | 0.71 | 0.88 | 0.99 | 1.01 | 1.03 | 1.03 | 0.98 | 0.96 | 0.94 | 0.94 | 0.95 | 0.96 |

*Indicates that material was not relofted

TABLE 10

| AFR, Basis Weight, Filler Loading and Thickness of Acoustic Articles with Scrims | | | | | | | | |
|---|---|---|---|---|---|---|---|---|
| Example | Porous Layer | Scrim | AFR of Base Web (MKS Rayls) | AFR of Scrims (MKS Rayls) | Total Basis Weight* (gsm) | Filler Loading (wt %)** | Filler Loading (vol %) | Thickness Test 2* (mm) |
| EX-10 | EX 4 | PE 16 (1×) | 2940 | 1060 | 972 | 41.5 | 2.3 | 11.0 |
| EX-11 | EX 4 | PE 15 (2×) | 2940 | 2180 | 1087 | 41.5 | 2.3 | 11.5 |
| EX-12 | EX 9 | PE 15 (1×) | 2690 | 1090 | 873 | 30.6 | 1.9 | 10.6 |
| CE-8 | CE-6 | PE 15 (1×) | 3140 | 1090 | 881 | N/A | N/A | 9.4 |
| CE-9 | CE-7 | PE 15 (1×) | 2430 | 1090 | 930 | 35.0 | 1.3 | 10.6 |

*Additive sum of scrims and webs

**Loading in porous layer without scrim

TABLE 11

| Absorption of Acoustic Articles with Scrims in Alpha Cabin | | | | | | | | | | | | | | | |
|---|---|---|---|---|---|---|---|---|---|---|---|---|---|---|---|
| Frequency [Hz] | 400 | 500 | 630 | 800 | 1,000 | 1,250 | 1,600 | 2,000 | 2,500 | 3,150 | 4,000 | 5,000 | 6,300 | 8,000 | 10k |
| EX-10 | 0.19 | 0.48 | 0.81 | 0.94 | 0.89 | 0.90 | 0.84 | 0.84 | 0.82 | 0.72 | 0.85 | 0.84 | 0.86 | 0.86 | 0.88 |
| EX-11 | 0.20 | 0.53 | 0.90 | 0.91 | 0.82 | 0.79 | 0.73 | 0.71 | 0.70 | 0.68 | 0.68 | 0.66 | 0.69 | 0.69 | 0.71 |
| EX-12 | 0.21 | 0.48 | 0.72 | 0.95 | 1.03 | 1.06 | 1.03 | 1.01 | 0.94 | 0.90 | 0.88 | 0.86 | 0.86 | 0.86 | 0.87 |
| CE-8 | 0.14 | 0.34 | 0.52 | 0.79 | 0.93 | 0.97 | 0.94 | 0.90 | 0.86 | 0.82 | 0.82 | 0.81 | 0.84 | 0.83 | 0.85 |
| CE-9 | 0.18 | 0.40 | 0.62 | 0.84 | 0.95 | 0.99 | 0.97 | 0.96 | 0.91 | 0.86 | 0.86 | 0.83 | 0.83 | 0.85 | 0.83 |

TABLE 12

| Basis Weights, EFD, Filler Loading, Thickness, and AFR of Acoustic Articles | | | | | | | | | |
|---|---|---|---|---|---|---|---|---|---|
| Example | Filler | Base Web Basis Weight (gsm) | EFD (μm) | Total Web Basis Weight (gsm) | Fiber Solidity (%) | Filler Loading (wt %) | Filler Loading (vol %) | Thickness Test 2 (mm) | AFR (MKS Rayls) |
| EX-13 | PE-2 | 397 | 5.5 | 830 | 4.7 | 52.2 | 3.1 | 9.3 | 2955 |
| EX-14 | PE-4 | 382 | 6.2 | 803 | 4.5 | 52.4 | 3.0 | 9.3 | 2715 |
| EX-15 | PE-6 | 379 | 5.7 | 723 | 5.0 | 47.6 | 3.5 | 8.3 | 3170 |
| CE-10 | PE-10 | 372 | 5.6 | 804 | 4.0 | 53.7 | 2.0 | 10.3 | 3000 |

TABLE 13

| Absorption of Acoustic Articles in Alpha Cabin | | | | | | | | | | | | | | | |
|---|---|---|---|---|---|---|---|---|---|---|---|---|---|---|---|
| Frequency [Hz] | 400 | 500 | 630 | 800 | 1,000 | 1,250 | 1,600 | 2,000 | 2,500 | 3,150 | 4,000 | 5,000 | 6,300 | 8,000 | 10k |
| EX-13 | 0.14 | 0.31 | 0.45 | 0.68 | 0.85 | 0.96 | 0.96 | 0.99 | 1.00 | 0.97 | 0.94 | 0.93 | 0.95 | 0.96 | 0.96 |
| EX-14 | 0.15 | 0.32 | 0.46 | 0.69 | 0.86 | 0.98 | 0.99 | 1.01 | 1.01 | 0.99 | 0.97 | 0.94 | 0.96 | 0.96 | 0.98 |
| EX-15 | 0.10 | 0.22 | 0.34 | 0.59 | 0.82 | 0.92 | 0.95 | 0.97 | 0.98 | 0.93 | 0.92 | 0.91 | 0.92 | 0.93 | 0.93 |
| CE-10 | 0.17 | 0.36 | 0.52 | 0.74 | 0.88 | 0.96 | 0.96 | 0.98 | 0.97 | 0.94 | 0.93 | 0.91 | 0.93 | 0.94 | 0.95 |

TABLE 14

| Basis Weights, EFD, Filler Loading, Thickness, and AFR of Acoustic Articles | | | | | | | | | |
|---|---|---|---|---|---|---|---|---|---|
| ID | Filler | Base Web Basis Weight (gsm) | EFD (μm) | Total Web Basis Weight (gsm) | Fiber Solidity (%) | Filler Loading (wt %) | Filler Loading (vol %) | Thickness Test 2 (mm) | AFR (MKS Rayls) |
| CE-11 | PE-4 | 147 | 5.2 | 765 | 3.3 | 80.8 | 8.5 | 4.9 | 1870 |
| CE-12 | PE-6 | 137 | 4.6 | 662 | 3.0 | 79.3 | 8.8 | 5 | 2250 |
| CE-13 | PE-10 | 140 | 5.2 | 712 | 3.0 | 80.3 | 5.2 | 5.1 | 2000 |

TABLE 15

| Absorption of Acoustic Articles in Alpha Cabin | | | | | | | | | | | | | | | |
|---|---|---|---|---|---|---|---|---|---|---|---|---|---|---|---|
| Frequency [Hz] | 400 | 500 | 630 | 800 | 1,000 | 1,250 | 1,600 | 2,000 | 2,500 | 3,150 | 4,000 | 5,000 | 6,300 | 8,000 | 10k |
| CE-11 | 0.03 | 0.05 | 0.08 | 0.15 | 0.22 | 0.32 | 0.42 | 0.57 | 0.68 | 0.73 | 0.80 | 0.84 | 0.88 | 0.91 | 0.91 |
| CE-12 | 0.03 | 0.06 | 0.09 | 0.15 | 0.22 | 0.32 | 0.46 | 0.63 | 0.75 | 0.80 | 0.84 | 0.87 | 0.89 | 0.90 | 0.90 |
| CE-13 | 0.08 | 0.13 | 0.17 | 0.24 | 0.32 | 0.41 | 0.51 | 0.61 | 0.70 | 0.75 | 0.81 | 0.86 | 0.91 | 0.92 | 0.92 |

TABLE 16

| Basis Weights, EFD, Filler Loading, Thickness, and AFR of Acoustic Articles | | | | | | | |
|---|---|---|---|---|---|---|---|
| ID | Filler | Base Web Basis Weight (GSM) | EFD (μm) | Total Web Basis Weight (GSM) | Filler Loading (%) | Thickness Test 2 (mm) | AFR (MKS Rayls) |
| CE-14 | None | 406 | 5.7 | 406 | N/A | 4.5 | 4580 |
| CE-15 | None | 616 | 5.5 | 616 | N/A | 7.1 | 5780 |
| CE-16 | None | 763 | 4.5 | 763 | N/A | 12.7 | 10920 |
| CE-17 | PE-10 | 268 | 5.4 | 405 | 33.8 | 4.7 | 2520 |
| CE-18 | PE-10 | 395 | 5.6 | 597 | 33.8 | 7.2 | 3990 |
| CE-19 | PE-10 | 528 | 4.9 | 786 | 32.8 | 10.4 | 7120 |
| EX-16 | PE-4 | 265 | 5.2 | 402 | 34.1 | 5.0 | 2660 |
| EX-17 | PE-4 | 396 | NT | 590 | 32.9 | 7.0 | 4850 |
| EX-18 | PE-4 | 530 | 4.8 | 833 | 36.4 | 12.8 | 5460 |

N/A = not applicable; no filler used

TABLE 17

| Absorption of Acoustic Articles in Alpha Cabin | | | | | | | | | | | |
|---|---|---|---|---|---|---|---|---|---|---|---|
| ID | Samples Combined* | Total Basis Weight (GSM) | Filler Loading (%) | Total Thickness (mm) | α at 400 Hz | α at 500 Hz | α at 630 Hz | α at 800 Hz | α at 1000 Hz | α at 1250 Hz | α at 1600 Hz |
| CE-14 | CE-14 | 406 | N/A | 4.5 | 0.02 | 0.03 | 0.05 | 0.09 | 0.16 | 0.30 | 0.51 |
| CE-15 | CE-15 | 616 | N/A | 7.1 | 0.04 | 0.06 | 0.12 | 0.26 | 0.56 | 0.87 | 0.95 |
| CE-20 | CE-14 + CE-14 | 812 | N/A | 9.0 | 0.09 | 0.21 | 0.38 | 0.78 | 0.98 | 0.95 | 0.83 |
| CE-21 | CE-14 + CE-15 | 1022 | N/A | 11.6 | 0.13 | 0.34 | 0.66 | 1.00 | 0.88 | 0.83 | 0.74 |
| CE-16 | CE-16 | 763 | N/A | 12.7 | 0.10 | 0.26 | 0.51 | 1.02 | 1.02 | 0.94 | 0.83 |
| CE-22 | CE-15 + CE-15 | 1232 | N/A | 14.2 | 0.27 | 0.72 | 1.02 | 0.81 | 0.72 | 0.71 | 0.71 |
| CE-23 | CE-14 + CE-16 | 1168 | N/A | 17.2 | 0.32 | 0.86 | 1.06 | 0.75 | 0.66 | 0.67 | 0.70 |
| CE-24 | CE-15 + CE-16 | 1379 | N/A | 19.8 | 0.60 | 0.97 | 0.87 | 0.63 | 0.60 | 0.67 | 0.73 |
| CE-25 | CE-16 + CE-16 | 1534 | N/A | 25.4 | 0.84 | 0.92 | 0.80 | 0.65 | 0.71 | 0.85 | 0.88 |
| CE-17 | CE-17 | 405 | 33.8 | 4.7 | 0.03 | 0.05 | 0.09 | 0.15 | 0.25 | 0.39 | 0.54 |
| CE-18 | CE-18 | 597 | 33.8 | 7.2 | 0.06 | 0.11 | 0.19 | 0.34 | 0.60 | 0.80 | 0.89 |
| CE-19 | CE-19 | 786 | 32.8 | 10.4 | 0.11 | 0.27 | 0.45 | 0.79 | 0.95 | 0.99 | 0.95 |
| CE-26 | CE-17 + CE-18 | 1002 | 33.8 | 11.9 | 0.19 | 0.47 | 0.79 | 0.94 | 0.90 | 0.90 | 0.86 |
| CE-27 | CE-17 + CE-19 | 1191 | 33.2 | 15.4 | 0.32 | 0.74 | 1.02 | 0.89 | 0.83 | 0.84 | 0.82 |
| CE-28 | CE-18 + CE-19 | 1383 | 33.3 | 17.6 | 0.46 | 0.88 | 0.99 | 0.82 | 0.79 | 0.82 | 0.83 |
| CE-29 | CE-19 + CE-19 | 1578 | 32.7 | 20.8 | 0.71 | 0.91 | 0.92 | 0.76 | 0.77 | 0.83 | 0.86 |
| CE-30 | CE-17 + CE-18 + CE-19 | 1788 | 33.4 | 22.3 | 0.85 | 0.82 | 0.81 | 0.70 | 0.76 | 0.83 | 0.83 |
| EX-16 | EX-16 | 402 | 34.1 | 5.0 | 0.03 | 0.05 | 0.08 | 0.16 | 0.28 | 0.47 | 0.68 |
| EX-17 | EX-17 | 590 | 32.9 | 7.0 | 0.04 | 0.09 | 0.16 | 0.33 | 0.63 | 0.86 | 0.94 |
| EX-18 | EX-18 | 833 | 36.4 | 12.8 | 0.16 | 0.41 | 0.68 | 0.94 | 0.98 | 0.99 | 0.95 |
| EX-19 | EX-16 + EX-17 | 992 | 33.4 | 12.0 | 0.17 | 0.46 | 0.80 | 0.99 | 0.92 | 0.90 | 0.84 |

TABLE 17-continued

Absorption of Acoustic Articles in Alpha Cabin

| | | | | | | | | | | | |
|---|---|---|---|---|---|---|---|---|---|---|---|
| EX-20 | EX-17 + EX-17 | 1193 | 32.5 | 14.0 | 0.26 | 0.68 | 1.02 | 0.89 | 0.80 | 0.80 | 0.76 |
| EX-21 | EX-17 + EX-18 | 1423 | 34.9 | 19.8 | 0.53 | 0.94 | 1.03 | 0.86 | 0.84 | 0.89 | 0.90 |
| EX-22 | EX-16 + EX-17 + EX-18 | 1825 | 34.7 | 24.8 | 0.86 | 0.84 | 0.86 | 0.76 | 0.83 | 0.93 | 0.93 |
| EX-23 | EX-18 + EX-18 | 1678 | 36.1 | 25.6 | 0.86 | 0.91 | 0.90 | 0.79 | 0.83 | 0.89 | 0.91 |

| ID | Samples Combined* | α at 2000 Hz | α at 2500 Hz | α at 3150 Hz | α at 4000 Hz | α at 5000 Hz | α at 6300 Hz | α at 8000 Hz | α at 10k Hz |
|---|---|---|---|---|---|---|---|---|---|
| CE-14 | CE-14 | 0.76 | 0.86 | 0.83 | 0.82 | 0.79 | 0.80 | 0.82 | 0.83 |
| CE-15 | CE-15 | 0.90 | 0.85 | 0.80 | 0.80 | 0.80 | 0.84 | 0.85 | 0.89 |
| CE-20 | CE-14 + CE-14 | 0.78 | 0.73 | 0.70 | 0.73 | 0.73 | 0.78 | 0.80 | 0.83 |
| CE-21 | CE-14 + CE-15 | 0.75 | 0.78 | 0.79 | 0.83 | 0.82 | 0.86 | 0.88 | 0.90 |
| CE-16 | CE-16 | 0.84 | 0.87 | 0.88 | 0.89 | 0.89 | 0.92 | 0.93 | 0.95 |
| CE-22 | CE-15 + CE-15 | 0.75 | 0.76 | 0.75 | 0.78 | 0.79 | 0.84 | 0.87 | 0.87 |
| CE-23 | CE-14 + CE-16 | 0.73 | 0.72 | 0.72 | 0.74 | 0.72 | 0.79 | 0.83 | 0.87 |
| CE-24 | CE-15 + CE-16 | 0.75 | 0.77 | 0.78 | 0.81 | 0.81 | 0.84 | 0.90 | 0.92 |
| CE-25 | CE-16 + CE-16 | 0.89 | 0.89 | 0.89 | 0.91 | 0.91 | 0.92 | 0.95 | 0.96 |
| CE-17 | CE-17 | 0.71 | 0.80 | 0.81 | 0.84 | 0.84 | 0.87 | 0.88 | 0.89 |
| CE-18 | CE-18 | 0.93 | 0.93 | 0.88 | 0.87 | 0.86 | 0.88 | 0.89 | 0.93 |
| CE-19 | CE-19 | 0.93 | 0.92 | 0.87 | 0.88 | 0.87 | 0.90 | 0.92 | 0.95 |
| CE-26 | CE-17 + CE-18 | 0.85 | 0.84 | 0.80 | 0.82 | 0.82 | 0.85 | 0,89 | 0.91 |
| CE-27 | CE-17 + CE-19 | 0.85 | 0.86 | 0.83 | 0.86 | 0.83 | 0.86 | 0.91 | 0.91 |
| CE-28 | CE-18 + CE-19 | 0.87 | 0.85 | 0.84 | 0.86 | 0.85 | 0.88 | 0.93 | 0.93 |
| CE-29 | CE-19 + CE-19 | 0.88 | 0.88 | 0.87 | 0.90 | 0.90 | 0.90 | 0.96 | 0.97 |
| CE-30 | CE-17 + CE-18 + CE-19 | 0.84 | 0.83 | 0.84 | 0.85 | 0.85 | 0.86 | 0.91 | 0.94 |
| EX-16 | EX-16 | 0.82 | 0.89 | 0.87 | 0.88 | 0.87 | 0.87 | 0.87 | 0.89 |
| EX-17 | EX-17 | 0.93 | 0.92 | 0.86 | 0.86 | 0.86 | 0.87 | 0.88 | 0.91 |
| EX-18 | EX-18 | 0.95 | 0.95 | 0.92 | 0.94 | 0.92 | 0.94 | 0.97 | 0.96 |
| EX-19 | EX-16 + EX-17 | 0.84 | 0.82 | 0.79 | 0.82 | 0.80 | 0.83 | 0.88 | 0.89 |
| EX-20 | EX-17 + EX-17 | 0.79 | 0.80 | 0.78 | 0.81 | 0.80 | 0.85 | 0.90 | 0.90 |
| EX-21 | EX-17 + EX-18 | 0.93 | 0.93 | 0,91 | 0.92 | 0.89 | 0.92 | 0.98 | 0.97 |
| EX-22 | EX-16 + EX-17 + EX-18 | 0.96 | 0.94 | 0.95 | 0.95 | 0.94 | 0.95 | 0.99 | 1.01 |
| EX-23 | EX-18 + EX-18 | 0.96 | 0.94 | 0.93 | 0.96 | 0,93 | 0.95 | 0.99 | 0.99 |

*Samples stacked with thinner sample(s) at the top.
N/A = not applicable; no filler used

TABLE 18

Absorption of Acoustic Articles in Impedance Tube

| ID | Samples Com-bined* | Sample Gap Height (mm) | Total Basis Weight (gsm) | Filler Loading (%) | α at 124 Hz | α at 160 Hz | α at 200 Hz | α at 248 Hz | α at 316 Hz | α at 400 Hz | α at 500 Hz | α at 632 Hz | α at 800 Hz | α at 1000 Hz | α at 1248 Hz | α at 1600 Hz | α at 2000 Hz | α at 2500 Hz |
|---|---|---|---|---|---|---|---|---|---|---|---|---|---|---|---|---|---|---|
| CE-14 | CE-14 | 5 | 423 | N/A | 0.02 | 0.02 | 0.03 | 0.03 | 0.03 | 0.04 | 0.04 | 0.05 | 0.08 | 0.11 | 0.20 | 0.35 | 0.49 | 0.56 |
| CE-15 | CE-15 | 7 | 656 | N/A | 0.01 | 0.02 | 0.03 | 0.03 | 0.04 | 0.05 | 0.06 | 0.09 | 0.16 | 0.33 | 0.53 | 0.61 | 0.56 | 0.53 |
| CE-16 | CE-16 | 13 | 756 | N/A | 0.02 | 0.02 | 0.03 | 0.03 | 0.04 | 0.05 | 0.09 | 0.22 | 0.55 | 0.77 | 0.68 | 0.55 | 0.52 | 0.53 |
| CE-20 | CE-14 + CE-14 | 8 | 840 | N/A | 0.02 | 0.02 | 0.03 | 0.04 | 0.04 | 0.06 | 0.09 | 0.16 | 0.36 | 0.60 | 0.62 | 0.52 | 0.46 | 0.44 |

TABLE 18-continued

Absorption of Acoustic Articles in Impedance Tube

| ID | Samples Combined* | Sample Gap Height (mm) | Total Basis Weight (gsm) | Filler Loading (%) | α at 124 Hz | α at 160 Hz | α at 200 Hz | α at 248 Hz | α at 316 Hz | α at 400 Hz | α at 500 Hz | α at 632 Hz | α at 800 Hz | α at 1000 Hz | α at 1248 Hz | α at 1600 Hz | α at 2000 Hz | α at 2500 Hz |
|---|---|---|---|---|---|---|---|---|---|---|---|---|---|---|---|---|---|---|
| CE-21 | CE-14 + CE-15 | 10 | 1067 | N/A | 0.03 | 0.02 | 0.04 | 0.05 | 0.06 | 0.07 | 0.11 | 0.22 | 0.52 | 0.65 | 0.54 | 0.44 | 0.42 | 0.44 |
| CE-23 | CE-14 + CE-16 | 14 | 1210 | N/A | 0.03 | 0.04 | 0.05 | 0.05 | 0.07 | 0.09 | 0.18 | 0.54 | 0.68 | 0.50 | 0.40 | 0.34 | 0.40 | 0.47 |
| CE-22 | CE-15 + CE-15 | 13 | 1269 | N/A | 0.02 | 0.03 | 0.04 | 0.05 | 0.06 | 0.10 | 0.19 | 0.44 | 0.68 | 0.53 | 0.43 | 0.37 | 0.40 | 0.46 |
| CE-24 | CE-15 + CE-16 | 15 | 1437 | N/A | 0.04 | 0.04 | 0.05 | 0.06 | 0.07 | 0.12 | 0.31 | 0.72 | 0.54 | 0.42 | 0.33 | 0.35 | 0.44 | 0.47 |
| CE-25 | CE-16 + CE-16 | 22 | 1549 | N/A | 0.02 | 0.04 | 0.06 | 0.08 | 0.14 | 0.35 | 0.79 | 0.67 | 0.47 | 0.39 | 0.44 | 0.55 | 0.56 | 0.58 |
| CE-17 | CE-17 | 6 | 429 | 33.8 | 0.02 | 0.03 | 0.03 | 0.03 | 0.04 | 0.04 | 0.05 | 0.07 | 0.10 | 0.16 | 0.25 | 0.38 | 0.51 | 0.63 |
| CE-18 | CE-18 | 9 | 619 | 33.8 | 0.03 | 0.03 | 0.03 | 0.04 | 0.05 | 0.06 | 0.08 | 0.14 | 0.25 | 0.40 | 0.54 | 0.65 | 0.69 | 0.70 |
| CE-19 | CE-19 | 13 | 802 | 32.8 | 0.03 | 0.03 | 0.04 | 0.05 | 0.07 | 0.09 | 0.15 | 0.28 | 0.50 | 0.65 | 0.69 | 0.66 | 0.64 | 0.64 |
| CE-26 | CE-17 + CE-18 | 14 | 1048 | 33.8 | 0.03 | 0.03 | 0.04 | 0.05 | 0.07 | 0.13 | 0.26 | 0.46 | 0.66 | 0.69 | 0.69 | 0.64 | 0.61 | 0.62 |
| CE-27 | CE-17 + CE-19 | 17 | 1294 | 33.2 | 0.05 | 0.05 | 0.05 | 0.07 | 0.12 | 0.25 | 0.48 | 0.69 | 0.68 | 0.62 | 0.59 | 0.58 | 0.60 | 0.64 |
| CE-28 | CE-18 + CE-19 | 19 | 1496 | 33.3 | 0.04 | 0.04 | 0.06 | 0.09 | 0.19 | 0.43 | 0.69 | 0.69 | 0.59 | 0.53 | 0.52 | 0.53 | 0.55 | 0.57 |
| CE-29 | CE-19 + CE-19 | 21 | 1688 | 32.7 | 0.05 | 0.05 | 0.07 | 0.11 | 0.24 | 0.52 | 0.73 | 0.62 | 0.51 | 0.46 | 0.48 | 0.53 | 0.57 | 0.61 |
| EX-16 | EX-16 | 7 | 414 | 34.1 | 0.03 | 0.02 | 0.02 | 0.02 | 0.03 | 0.03 | 0.04 | 0.07 | 0.12 | 0.21 | 0.34 | 0.51 | 0.61 | 0.67 |
| EX-17 | EX-17 | 9 | 601 | 32.9 | 0.03 | 0.02 | 0.02 | 0.02 | 0.03 | 0.04 | 0.06 | 0.10 | 0.20 | 0.36 | 0.54 | 0.66 | 0.68 | 0.67 |
| EX-18 | EX-18 | 13 | 830 | 36.4 | 0.02 | 0.02 | 0.04 | 0.03 | 0.05 | 0.08 | 0.15 | 0.30 | 0.52 | 0.66 | 0.68 | 0.65 | 0.62 | 0.61 |
| EX-20 | EX-17 + EX-17 | 17 | 1202 | 32.5 | 0.02 | 0.02 | 0.04 | 0.05 | 0.10 | 0.21 | 0.42 | 0.69 | 0.71 | 0.63 | 0.58 | 0.55 | 0.56 | 0.61 |
| EX-21 | EX-17 + EX-18 | 22 | 1431 | 34.9 | 0.02 | 0.03 | 0.05 | 0.09 | 0.19 | 0.41 | 0.65 | 0.71 | 0.64 | 0.58 | 0.56 | 0.58 | 0.62 | 0.67 |
| EX-23 | EX-18 + EX-18 | 24 | 1660 | 36.1 | 0.03 | 0.04 | 0.07 | 0.15 | 0.33 | 0.62 | 0.73 | 0.69 | 0.62 | 0.58 | 0.56 | 0.57 | 0.59 | 0.62 |
| EX-24 | EX-16 + EX-18 | 19 | 1244 | 35.4 | 0.02 | 0.03 | 0.04 | 0.06 | 0.13 | 0.30 | 0.55 | 0.74 | 0.72 | 0.67 | 0.63 | 0.62 | 0.63 | 0.65 |

N/A = not applicable; no filler used

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An acoustic article comprising:

a porous layer; and heterogeneous filler, the heterogeneous filler being substantially non-porous and containing no holes or voids present in an amount of from 0.25% to 7% by volume relative to the total volume of the porous layer, and having a specific surface area of from 0.01 m/g to 1 $m^2/g$, wherein the porous layer is a non-woven fibrous layer comprising a plurality of fibers, wherein the heterogenous filler is enmeshed in the plurality of fibers, wherein the enmeshed filler particles are decoupled from each other and the porous layer and have an average interparticle spacing from 20 micrometers to 4000 micrometers, and wherein the acoustic article has a flow resistance of from 500 MKS Rayls to 12,000 MKS Rayls.

2. The acoustic article of claim 1, wherein the heterogeneous filler has a median particle size of from 100 micrometers to 1000 micrometers.

3. The acoustic article of claim 1, wherein the porous layer has a solidity of from 1 percent to 10 percent, excluding the heterogeneous filler.

4. The acoustic article of claim 1, wherein the heterogeneous filler comprises a thermoset polymer, and optionally a semicrystalline thermoset polymer.

5. The acoustic article of claim 4, wherein the thermoset polymer comprises a urea-formaldehyde polymer.

6. The acoustic article of claim 4, wherein the thermoset polymer comprises a polyester.

7. The acoustic article of claim 1, wherein the heterogeneous filler comprises an inorganic mineral.

8. The acoustic article of claim 7, wherein the inorganic mineral comprises an oxide or hydroxide.

9. The acoustic article of claim 8, wherein the inorganic mineral comprises aluminum oxide or aluminum oxyhydroxide.

10. The acoustic article of claim 7, wherein the inorganic mineral comprises a silicate glass.

11. The acoustic article of claim 1, wherein the heterogeneous filler, along with any aggregates thereof, in the porous layer are discontinuously dispersed in the porous layer.

12. The acoustic article of claim 1, wherein the heterogeneous filler is substantially non-aggregated.

13. The acoustic article of claim 1, wherein the porous layer comprises a non-woven fibrous layer having a plurality of fibers.

14. An acoustic assembly comprising:

the acoustic article of claim 1, wherein the acoustic article has opposing first and second major surfaces;

a substrate is disposed along the first major surface; and an air gap is disposed along the second major surface.

15. A method of making an acoustic article comprising:

directly forming a non-woven fibrous web out of a plurality of fibers;

delivering a heterogeneous filler into the non-woven fibrous web as the non-woven fibrous web is being directly formed, the heterogeneous filler being substantially non-porous and containing no holes or voids and being present in an amount of from 0.25% to 7% by volume relative to the total volume of the non-woven fibrous web and having a specific surface area of from 0.1 $m^2/g$ to 1 $m^2/g$, wherein the non-woven fibrous web defines a porous layer, wherein the heterogenous filler is enmeshed in the plurality of fibers, wherein the enmeshed filler particles are decoupled from each other and the porous layer, and wherein the acoustic article has a flow resistance of from 500 MKS Rayls to 12,000 MKS Rayls.

16. The acoustic article of claim 1, wherein the heterogeneous filler is at least 95% non-porous.

* * * * *